US012601299B1

(12) United States Patent
Reed et al.

(10) Patent No.: US 12,601,299 B1
(45) Date of Patent: Apr. 14, 2026

(54) HYDROGEN FUEL SYSTEM FOR AN AIRCRAFT

(71) Applicant: General Electric Company, Evendale, OH (US)

(72) Inventors: Ava Reed, Cincinnati, OH (US); Dustin Sheinberg, Cincinnati, OH (US); Christopher J. Kroger, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/180,630

(22) Filed: Apr. 16, 2025

(51) Int. Cl.
| | |
|---|---|
| *F02C 7/22* | (2006.01) |
| *B64C 7/02* | (2006.01) |
| *B64D 27/10* | (2006.01) |
| *B64D 37/30* | (2006.01) |
| *F02C 3/00* | (2006.01) |
| *F17C 11/00* | (2006.01) |

(52) U.S. Cl.
CPC .................. *F02C 7/22* (2013.01); *B64C 7/02* (2013.01); *B64D 27/10* (2013.01); *B64D 37/30* (2013.01); *F02C 3/00* (2013.01); *F17C 11/005* (2013.01); *F17C 2221/012* (2013.01); *F17C 2265/066* (2013.01); *F17C 2270/0189* (2013.01)

(58) Field of Classification Search
CPC .... F02C 7/22; F02C 7/232; F02C 3/00; F17C 11/005; F17C 2221/012; F17C 2265/066
See application file for complete search history.

(56) References Cited

U.S. PATENT DOCUMENTS 3,369,826 A * 2/1968 Boosey .................. F16L 59/12
285/47
8,430,237 B2 4/2013 Westenberger et al.
(Continued)

FOREIGN PATENT DOCUMENTS

| CN | 119948855 A | * | 5/2025 | ............. H04L 69/18 |
| EP | 3974701 A1 | * | 3/2022 | ........ H01M 8/04201 |

(Continued)

OTHER PUBLICATIONS

"Safety Standard for Hydrogen and Hydrogen Systems—Guidelines for Hydrogen System Design, Materials Selection, Operations, Storage, and Transportation," National Aeronautics and Space Administration.

*Primary Examiner* — Craig Kim
(74) *Attorney, Agent, or Firm* — Carter, DeLuca & Farrell, LLP

(57) ABSTRACT
A hydrogen fuel system for an aircraft includes a housing, a hydrogen fuel component, and a hydrogen storage structure. The hydrogen fuel component has a hydrogen fuel passage for hydrogen fuel to flow therethrough. The hydrogen fuel component is located within a volume of the housing. The hydrogen storage structure includes a hydrogen storage material having a morphology for retaining hydrogen within the hydrogen storage material. A hydrogen leak path is defined within the volume of the housing, a hydrogen accumulation region is defined within the volume of the housing, or both the hydrogen leak path and the hydrogen accumulation region is defined within the volume of the housing. The hydrogen storage structure is within the volume of the housing in at least one of the hydrogen leak path or in the hydrogen accumulation region.

19 Claims, 9 Drawing Sheets

(56) References Cited

U.S. PATENT DOCUMENTS

| | | | | |
|---|---|---|---|---|
| 9,009,972 | B2 * | 4/2015 | Stalcup, II | F16L 51/027 |
| | | | | 60/322 |
| 9,933,093 | B2 * | 4/2018 | Corrêa | F16L 27/12 |
| 10,006,568 | B2 * | 6/2018 | Callaghan | F01D 25/18 |
| 10,260,678 | B2 | 4/2019 | Christ | |
| 10,473,031 | B2 | 11/2019 | Ellsworth et al. | |
| 10,633,110 | B2 | 4/2020 | Sarkar et al. | |
| 11,807,383 | B2 | 11/2023 | Dean | |
| 11,905,028 | B2 | 2/2024 | Hillel et al. | |
| 12,269,336 | B2 * | 4/2025 | Orchard | B60K 15/013 |
| 2007/0108348 | A1 | 5/2007 | Peters | |
| 2014/0026597 | A1 * | 1/2014 | Epstein | F17C 13/005 |
| | | | | 62/53.2 |
| 2014/0150649 | A1 * | 6/2014 | Stolte | B64D 33/04 |
| | | | | 95/52 |
| 2019/0190041 | A1 | 6/2019 | Godula-Jopek et al. | |

| | | | | |
|---|---|---|---|---|
| 2023/0102097 | A1 * | 3/2023 | Soulie | F16L 17/06 |
| | | | | 285/123.15 |
| 2023/0294510 | A1 * | 9/2023 | Orchard | F16L 59/141 |
| | | | | 60/734 |
| 2023/0323814 | A1 * | 10/2023 | Terwilliger | F02C 3/22 |
| | | | | 60/806 |
| 2024/0418318 | A1 * | 12/2024 | Grip | B64D 37/06 |

FOREIGN PATENT DOCUMENTS

| | | | | |
|---|---|---|---|---|
| EP | 3885267 | B1 | 9/2023 | |
| EP | 4286740 | A1 * | 12/2023 | F17C 13/005 |
| EP | 4464930 | A1 * | 11/2024 | F17C 3/08 |
| EP | 4497843 | A2 * | 1/2025 | H01M 8/04089 |
| FR | 3127269 | A1 | 3/2023 | |
| FR | 3130896 | A1 | 6/2023 | |
| FR | 3130897 | A1 | 6/2023 | |
| FR | 3133367 | A1 | 9/2023 | |
| FR | 3133368 | A1 | 9/2023 | |

* cited by examiner

HYDROGEN FUEL SYSTEM FOR AN AIRCRAFT

TECHNICAL FIELD

The present disclosure relates to fuel systems and, in particular, to hydrogen fuel systems for aircraft.

BACKGROUND

Turbine engines used in aircraft generally include a fan and a turbo-engine section arranged in flow communication with one another. A combustor is arranged in the turbo-engine to generate combustion gases for driving a turbine in the turbo-engine of the turbine engine, and the turbine may be used to drive the fan. A portion of air flowing into the fan flows through the turbo-engine as core air, and another portion of the air flowing into the fan bypasses the core section and flows through the turbine engine as bypass air. The turbo-engine section may include one or more compressors to compress the core air before the core air flows into the combustor. The combustion gases are typically exhausted from the turbine engine to the atmosphere.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 4A is taken along line 4A-4A in FIG. 4B, and FIG. 4B is taken along line 4B-4B in FIG. 4A.

FIG. 6A shows an arrangement of the hydrogen fuel component and the hydrogen storage structure within the compartment. FIG. 6B shows another arrangement of the hydrogen fuel component and the hydrogen storage structure within the compartment. FIG. 6C shows a further arrangement of the hydrogen fuel component and the hydrogen storage structure within the compartment. FIG. 6D shows yet another arrangement of the hydrogen fuel component and the hydrogen storage structure within the compartment.

DETAILED DESCRIPTION

Figure 1:
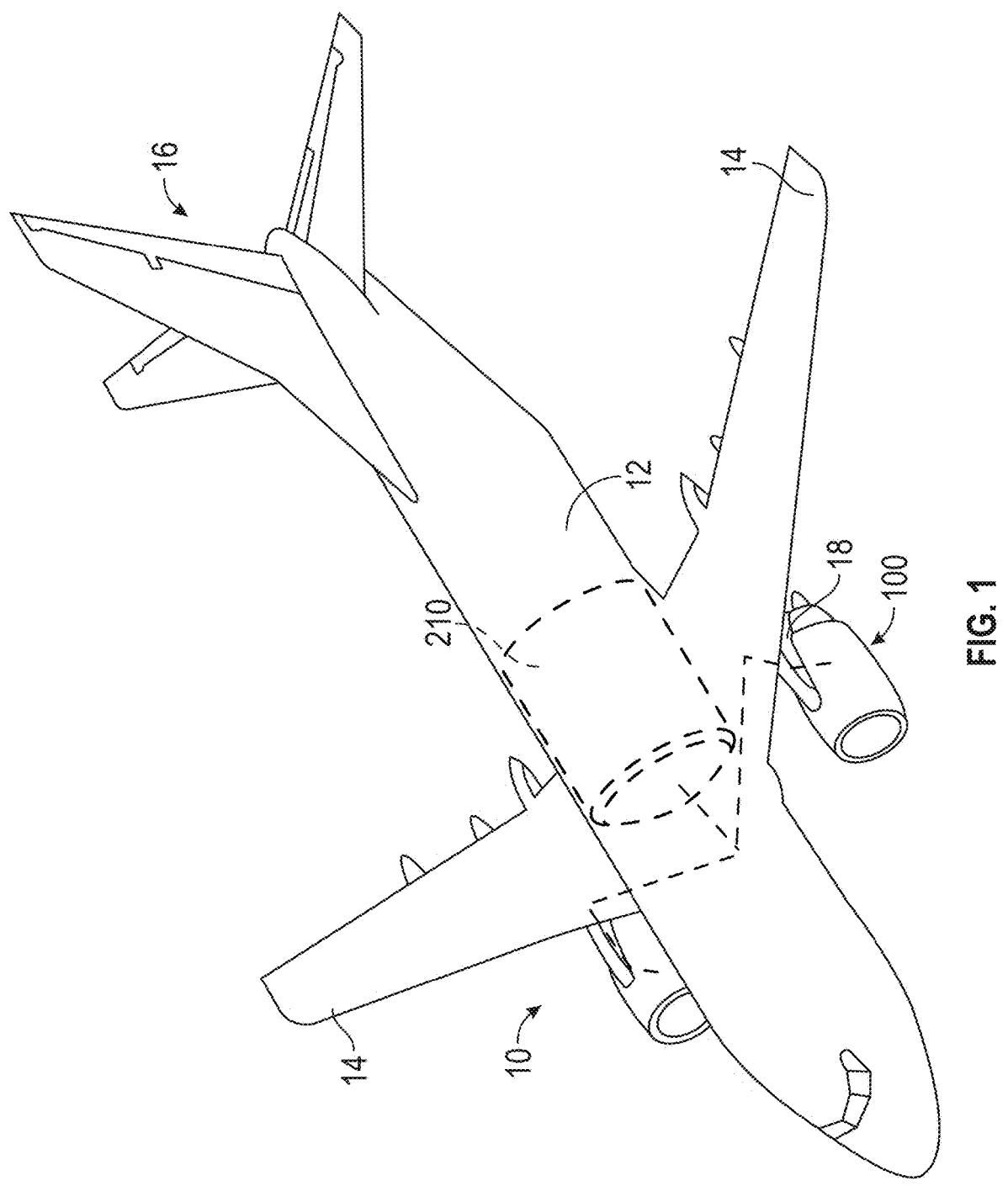
FIG. 1 is a schematic view of an aircraft.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," "third," and the like, may be used interchangeably to distinguish one component from another and are not intended to signify location or importance of the individual components.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline, such as, for example, a centerline of the turbine engine. Moreover, the terms "radial" and "radially" refer to directions and orientations that extend substantially perpendicular to these centerlines. In addition, as used herein, the terms "circumferential" and "circumferentially" refer to directions and orientations that extend arcuately about these centerlines.

The terms "inner" and "outer," when discussed in the context of radial directions, refer to locations relative to the longitudinal centerline of the component.

The terms "forward" and "aft" refer to relative positions within a turbine engine or vehicle, and are based on a normal operational attitude of the turbine engine or vehicle. More particularly, forward and aft are used herein with reference to a direction of travel of the vehicle and a direction of propulsive thrust of the turbine engine.

The terms to "upper," "higher," and "lower," when discussed in the context of relative positions of components or portions thereof, refer to relative positions within a turbine engine or an aircraft, and are based on a normal operational attitude of the turbine engine or the aircraft in an assembled or a ground idle condition of the aircraft or turbine engine.

The terms to "above" and "below," when discussed in the context of relative positions of components or portions thereof, refer to relative positions within a turbine engine or an aircraft, and are based on a normal operational attitude of the turbine engine or the aircraft in an assembled or a ground idle condition of the aircraft or turbine engine. The term "above" refers to a component or portion thereof that is positioned at a higher level than another component or portion thereof and also has an overlapping axial position, but the components are not necessarily in contact with each other. The term "below" refers to a component or portion thereof that is positioned at a lower level than another component or portion thereof and also has an overlapping axial position, but the components are not necessarily in contact with each other.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, a "hydrogen fuel" is a combustible composition or a compound that includes diatomic hydrogen ($H_2$). More specifically, the hydrogen fuel can include at least eighty weight percent diatomic hydrogen, at least ninety weight percent diatomic hydrogen, at least ninety-five weight percent diatomic hydrogen, or at least ninety-nine weight percent diatomic hydrogen by total weight of the fuel. In some embodiments, the hydrogen fuel can consist essentially of diatomic hydrogen. The hydrogen fuel can exist in one or more phases such as a liquid phase, a gaseous phase, or combinations thereof.

As used herein, the term "substantially completely" as used to describe a phase of the hydrogen fuel refers to at least seventy-five percent by mass of the described portion of the hydrogen fuel being in the stated phase, such as at least eighty-five percent, such as at least ninety percent, such as at least ninety-two and a five tenths percent, such as at least ninety-five percent, such as at least ninety-seven and a five tenths percent, or such as at least ninety-nine percent by mass of the described portion of the hydrogen fuel being in the stated phase.

As noted above, the combustion gases from a turbine engine may exhausted from the engine to the atmosphere. If a hydrocarbon-based fuel is used, the combustion products can include carbon dioxide. To reduce carbon dioxide emissions from aircraft, such as commercial aircraft, a hydrogen fuel can be used. The hydrogen fuel can be comprised of diatomic hydrogen. Hydrogen fuel, however, poses a number of challenges as compared to combustible hydrocarbon liquid fuel. For example, hydrogen fuel has a relatively low boiling point, and, in its gaseous form, hydrogen fuel has a much lower power density. Hydrogen fuel, when in a gaseous form, also tends to seep through materials and attachment points between components without leaving residue. Hydrogen fuel is colorless and odorless. Hydrogen fuel is also highly reactive (relative to other fuels, such as Jet-A fuel) with a wide range of flammability limits.

Leaking diatomic hydrogen can have undesirable impacts on the turbine engine. For example, diatomic hydrogen can damage components, such as by hydrogen embrittlement, including hydride embrittlement, high temperature hydrogen attack, hydrogen blistering, and hydrogen stress corrosion cracking. The fuel system disclosed herein includes a hydrogen storage structure that includes a hydrogen storage material having a morphology for retaining hydrogen within the hydrogen storage material. The hydrogen storage material can be located relative to a component, such as a hydrogen fuel component, to capture and to store any hydrogen that leaks from the hydrogen fuel component, mitigating diatomic hydrogen that has leaked from the hydrogen fuel component. By storing the leaked hydrogen in the hydrogen storage material, the hydrogen storage material prevents the hydrogen fuel from accumulating in undesirable locations, and the leaked hydrogen can be removed or released at an appropriate time of the flight and operating envelop that is better suited for the release or the removal of hydrogen.

FIG. 1 is a schematic view of an aircraft 10 that can implement some embodiments of the disclosure. The aircraft 10 includes a fuselage 12, a pair of wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of turbine engines 100. In this embodiment, each turbine engine 100 is attached to one of the wings 14 by a pylon 18 in an under-wing configuration. Although the turbine engine 100 is shown attached to the wing 14 in an under-wing configuration in FIG. 1, in other embodiments, the turbine engine 100 can have alternative configurations and be coupled to other portions of the aircraft 10. For example, the turbine engine 100 can additionally, or alternatively, include one or more aspects coupled to other parts of the aircraft 10, such as, for example, the empennage 16 and the fuselage 12.

Figure 2:
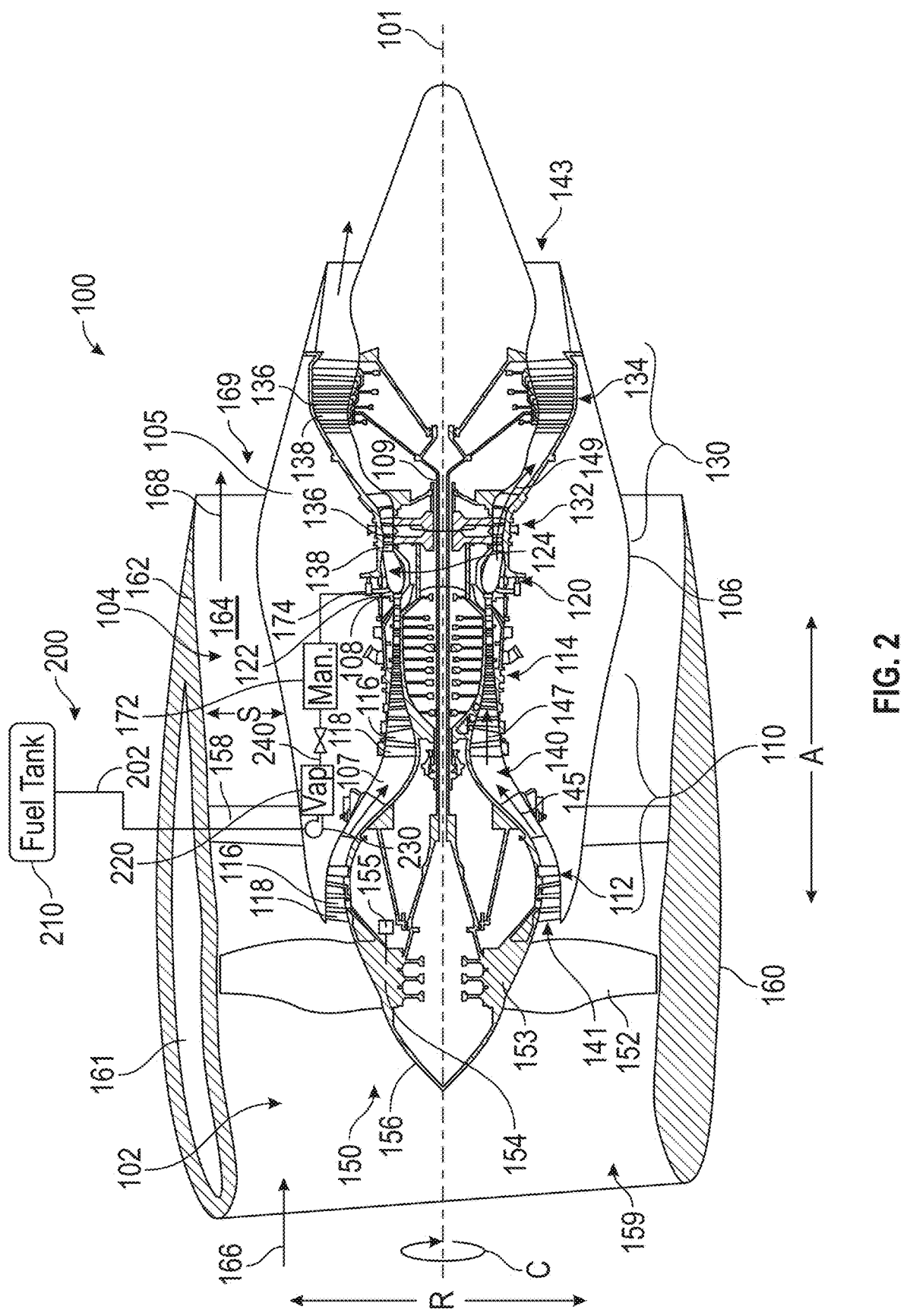
FIG. 2 is a schematic, cross-sectional view of one turbine engine of the aircraft shown in FIG. 1.
Figure 3:
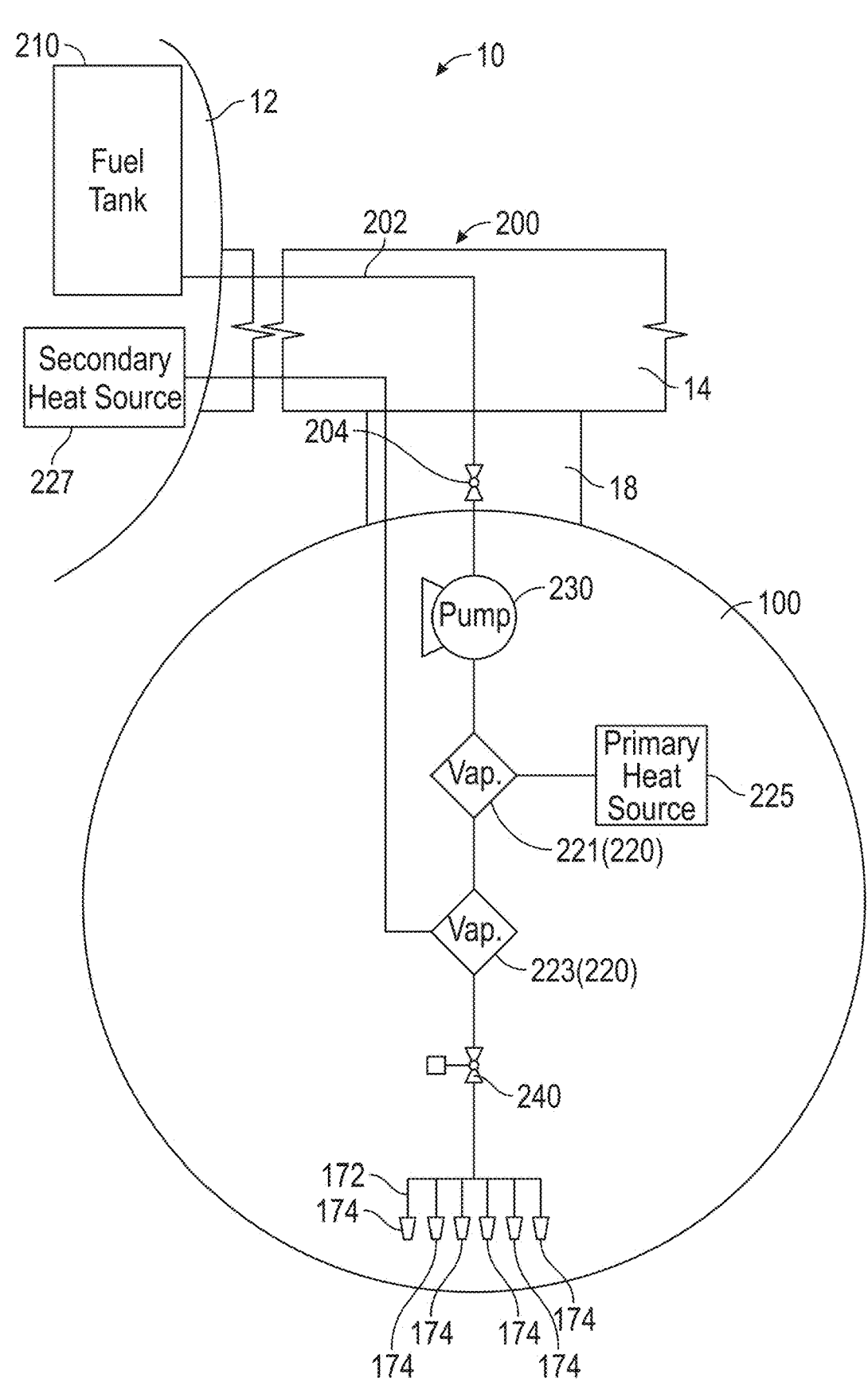
FIG. 3 is a schematic view of a fuel system for the aircraft shown in FIG. 1.

As will be described further below with reference to FIG. 2, the turbine engines 100 shown in FIG. 1 are gas turbine engines that are each capable of selectively generating a propulsive thrust for the aircraft 10. The amount of propulsive thrust can be controlled at least in part based on a volume of fuel provided to the turbine engines 100 via a fuel system 200 (FIGS. 2 and 3). In the embodiments discussed herein, the fuel is a hydrogen fuel that is stored in a fuel tank 210 of the fuel system 200. The fuel tank 210 can be located on board the aircraft, such as with at least a portion of the fuel tank 210 located in the fuselage 12 or, as depicted in FIG. 1, entirely within the fuselage 12. The fuel tank 210, however, can be located at other suitable locations in the fuselage 12 or the wing 14, such as with a portion of the fuel tank 210 in the fuselage 12 and a portion of the fuel tank 210 in the wing 14. Alternatively, the fuel tank 210 can also be located entirely within the wing 14. In the embodiment shown in FIG. 1, a single fuel tank 210 is used, and the fuel tank 210 is located within the fuselage such that, relative to the forward direction and the aft direction, the fuel tank 210 is located at the wing center of lift. Any suitable number of fuel tanks 210 can be used, however, including a plurality of fuel tanks 210. The plurality of fuel tanks 210 can include, for example, a forward fuel tank and an aft fuel tank. The forward fuel tank and the aft fuel tank can be located in the fuselage 12 and balanced about the wing center of lift to promote the stability of the aircraft 10 during flight. In another example, the plurality of fuel tanks 210 can include two separate tanks each located within a corresponding wing 14.

Although the aircraft 10 shown in FIG. 1 is an airplane, the embodiments described herein can also be applicable to other aircraft 10, including, for example, helicopters and unmanned aerial vehicles (UAV). The aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible). In other embodiments, the turbine engine can be any other turbine engine, such as an industrial turbine engine incorporated into a power generation system, or a nautical turbine engine on a ship or other vessel.

In addition, the embodiments described herein can also be applicable to other applications where hydrogen is used as a fuel, such as in engines, like reciprocating engines, other than turbine engines. Further, the engine, specifically, the turbine engine, is an example of a power generator using hydrogen as a fuel, but hydrogen can be used as a fuel for other power generators, including, for example, hydrogen fuel cells. Such power generators can be used in various applications, including stationary power-generation systems (including both gas turbines and hydrogen fuel cells) and other vehicles beyond the aircraft 10 explicitly described herein, such as boats, ships, cars, trucks, and the like.

FIG. 2 is a schematic, cross-sectional view of one of the turbine engines 100 used in the propulsion system for the aircraft 10 shown in FIG. 1. The turbine engine 100 has an axial direction A (extending parallel to a longitudinal centerline axis 101, shown for reference in FIG. 1), a radial direction R, and a circumferential direction C. The circumferential direction C extends in a direction rotating about the engine axial direction A. In the embodiment depicted in FIG. 1, the turbine engine 100 is a high bypass turbofan engine, including a fan section 102 and a turbo-engine 104 disposed downstream from the fan section 102.

The turbo-engine 104 depicted in FIG. 1 includes, in serial flow relationship, a compressor section 110, a combustion section 120, and a turbine section 130. The turbo-engine 104 is enclosed within an outer casing 106 that is tubular. The outer casing 106 can thus define, at least in part, a turbo-engine compartment 105 that can house various components of the turbo-engine 104.

The outer casing 106 can define a core inlet 141. In this embodiment, the core inlet 141 is annular. As schematically shown in FIG. 1, the compressor section 110 includes a booster or a low-pressure (LP) compressor 112 followed downstream by a high-pressure (HP) compressor 114. The combustion section 120 is downstream of the compressor section 110. The combustion section 120 includes a combustor 122 that can be downstream of the compressor section 110, such as downstream of the LP compressor 112 and downstream of the HP compressor 114. The turbine section 130 is downstream of the combustion section 120 and includes a high-pressure (HP) turbine 132 followed downstream by a low-pressure (LP) turbine 134. More specifically, the HP turbine 132 can be downstream of the combustion section 120, such as downstream of the combustor 122. The turbo-engine 104 further includes a core air exhaust nozzle 143 (also referred to as a jet exhaust nozzle) that is downstream of the turbine section 130. The compressor section 110, the combustion section 120, and the turbine section 130 together define, at least in part, a core air flow path 140 extending from the core inlet 141 to the core air exhaust nozzle 143, and through which core air 145 flows. As will be discussed in more detail below, the turbo-engine 104 includes a high-pressure (HP) shaft 108, and a low-pressure (LP) shaft 109. The HP shaft 108 drivingly connects the HP turbine 132 to the HP compressor 114. The HP turbine 132 and the HP compressor 114 rotate in unison through the HP shaft 108. The LP shaft 109 drivingly connects the LP turbine 134 to the LP compressor 112. The LP turbine 134 and the LP compressor 112 rotate in unison through the LP shaft 109.

Each of the LP compressor 112 and the HP compressor 114 can include a plurality of compressor stages. In each stage, a plurality of compressor blades 116 rotates relative to a corresponding plurality of static compressor vanes 118 (also called nozzles) to compress or to pressurize the core air 145 passing through the stage. In a single compressor stage, the plurality of compressor blades 116 can be provided in a ring, extending radially outwardly relative to the longitudinal centerline axis 101 from a blade platform to a blade tip (e.g., extend in the radial direction R). The compressor blades 116 can be a part of a compressor rotor that includes a disk and each compressor blade 116 of the plurality of compressor blades 116 extends radially from the disk. Other configurations of the compressor rotor can be used, including, for example, blisks where the disk and the compressor blades 116 are integrally formed with each other to be a single piece. The corresponding static compressor vanes 118 are located upstream of and adjacent to the rotating compressor blades 116. The compressor vanes 118 for a stage of the compressor can be mounted to a core casing 107 in a circumferential arrangement. The core casing 107 can define, at least in part, the core air flow path 140. Each compressor stage can be used to sequentially compress the core air 145 flowing through the core air flow path 140, generating compressed air 147. Any suitable number of compressor blades 116, compressor vanes 118, and compressor stages can be used.

Each of the HP turbine 132 and the LP turbine 134 also can include a plurality of turbine stages. In each stage, a plurality of turbine blades 136 rotates relative to a corresponding plurality of static turbine vanes 138 (also called a nozzle) to extract energy from combustion gases 149 passing through the stage. The turbine blades 136 can be a part of a turbine rotor. Any suitable configuration for a turbine rotor can be used, including, for example, a disk with the plurality of turbine blades 136 extending from the disk. The corresponding static turbine vanes 138 are located upstream of and adjacent to the rotating turbine blades 136. The turbine vanes 138 for a stage of the turbine can be mounted to the core casing 107 in a circumferential arrangement.

In the combustion section 120, fuel, received from the fuel system 200, is injected into a combustion chamber 124 of a combustor 122 by one or more fuel nozzles 174. The combustor 122 is downstream of the compressor section 110, such as downstream of the HP compressor 114. The fuel is mixed with the compressed air 147 from the compressor section 110 to form a fuel and air mixture, and combusted, generating combustion products (e.g., combustion gases 149). Adjusting a fuel metering unit (e.g., a fuel metering valve 240) of the fuel system changes the volume of fuel provided to the combustion chamber 124 and, thus, changes the amount of propulsive thrust produced by the turbine engine 100 to propel the aircraft. The combustion gases 149 are discharged from the combustion chamber 124. These combustion gases can be directed into the turbine blades 136 of the HP turbine 132 and, then, the turbine blades 136 of the LP turbine 134, and the combustion gases 149 drive (rotate) the turbine blades 136 of the HP turbine 132 and the LP turbine 134. Any suitable number of turbine blades 136, turbine vanes 138, and turbine stages can be used. After flowing through the turbine section 130, the combustion gases 149 are exhausted from the turbine engine 100 through the core air exhaust nozzle 143 to provide propulsive thrust.

The turbine engine 100 and, more specifically, the turbo-engine 104 further includes one or more drive shafts. As noted above, the turbo-engine 104 includes the high-pressure (HP) shaft 108 drivingly connecting the HP turbine 132 to the HP compressor 114, and the low-pressure (LP) shaft 109 drivingly connecting the LP turbine 134 to the LP compressor 112. More specifically, the turbine rotors of the HP turbine 132 are connected to the HP shaft 108, and the compressor rotors of the HP compressor 114 are connected to the HP shaft 108. The combustion gases 149 are routed into the HP turbine 132 and expanded through the HP turbine 132 where a portion of thermal energy or kinetic energy from the combustion gases 149 is extracted via the one or more stages of the turbine blades 136 and turbine vanes 138 of the HP turbine 132. This causes the HP shaft 108 to rotate, which supports operation of the HP compressor 114 (self-sustaining cycle) and rotating the compressor rotors and, thus, the compressor blades 116 of the HP compressor 114 via the HP shaft 108. In this way, the combustion gases 149 do work on the HP turbine 132. The combustion gases 149 are then routed into the LP turbine 134 and expanded through the LP turbine 134. Here, a second portion of the thermal energy or the kinetic energy is extracted from the combustion gases 149 via one or more stages of the turbine blades 136 and the turbine vanes 138 of the LP turbine 134. This causes the LP shaft 109 to rotate, which supports operation of the LP compressor 112 (self-sustaining cycle), and rotation of the compressor rotors and, thus, the compressor blades 116 of the LP compressor 112 via the LP shaft 109. In this way, the combustion gases 149 do work on the LP turbine 134. The HP shaft 108 and the LP shaft 109 are disposed coaxially about the longitudinal centerline axis 101. The HP shaft 108 has a diameter greater than that of the LP shaft 109, and the HP shaft 108 is located radially outward of the LP shaft 109. The HP shaft 108 and the LP shaft 109 are rotatable about the longitudinal centerline axis 101 and, as discussed above, coupled to rotatable elements such as the compressor rotors and the turbine rotors.

The fan section 102 shown in FIG. 1 includes a fan 150 having a plurality of fan blades 152 coupled to a disk 153. As depicted in FIG. 1, the fan blades 152 extend outwardly from the disk 153 generally along the radial direction R. In the case of a variable pitch fan, as depicted in FIG. 1, for example, the plurality of fan blades 152 is rotatable relative to the disk 153 about a pitch axis P. Each of the fan blades 152 can be connected to the disk 153 by a pitch bearing 154 that allows for rotation of the fan blades 152 about the pitch axis P. The fan blades 152 are rotatable within the pitch bearing 154 by an actuator 155 operatively coupled to the fan blades 152 to collectively vary the pitch of the fan blades 152 in unison. The fan blades 152 and the disk 153 are rotatable, together, about the longitudinal centerline (axis) 101 by the LP shaft 109. The LP compressor 112 can also be directly driven by the LP shaft 109, as depicted in FIG. 1. The disk 153 is covered by a fan hub 156 aerodynamically contoured to promote an airflow through the plurality of fan blades 152. Further, a nacelle 160 circumferentially surrounds the fan 150 and, in the depicted embodiment, at least a portion of the turbo-engine 104. The nacelle 160 may also be referred to as an annular fan casing or an outer nacelle. The nacelle 160 can include one or more compartments located therein, such compartments may be referred to herein as nacelle compartments 161. The nacelle 160 is supported relative to the turbo-engine 104 and, more specifically, the outer casing 106 by a plurality of outlet guide vanes 158 that is circumferentially spaced about the nacelle 160 and the turbo-engine 104. A downstream section 162 of the nacelle 160 extends over an outer portion of the turbo-engine 104 and, more specifically, the outer casing 106 so as to define a bypass airflow passage 164 therebetween.

During operation of the turbine engine 100, a volume of air 166 enters the turbine engine 100 through an inlet of the nacelle 160 and/or the fan section 102 (referred to herein as an engine inlet 159). As the volume of air 166 passes across the fan blades 152, a first portion of air (bypass air 168) is directed or routed into the bypass airflow passage 164, and a second portion of air (e.g., the core air 145) is directed or is routed into an upstream section of the core air flow path 140, or, more specifically, into the core inlet 141. The ratio between the bypass air 168 and the core air 145 is commonly known as a bypass ratio. Simultaneously with the flow of the core air 145 through the core air flow path 140 (as discussed above), the bypass air 168 is routed through the bypass airflow passage 164 before being exhausted from a bypass air discharge nozzle 169 of the turbine engine 100, also providing propulsive thrust. The bypass air discharge nozzle 169 and the core air exhaust nozzle 143 are air exhaust nozzles of the turbine engine 100.

The turbine engine 100 shown in FIG. 1 and discussed herein (e.g., a turbofan engine) is provided by way of example only. In other embodiments, any other suitable engine can be utilized with aspects of the present disclosure. For example, in other embodiments, the engine can be any other suitable turbine engine, such as a turboshaft engine, a turboprop engine, a turbojet engine, an unducted single fan engine, and the like. In such a manner, in other embodiments, the turbine engine can have other suitable configurations, such as other suitable numbers or arrangements of shafts, compressors, turbines, fans, etc. Further, although the turbine engine 100 is shown as a direct drive, fixed-pitch turbofan engine, in other embodiments, the turbine engine 100 can be a geared turbine engine (e.g., including a gearbox between the fan 150 and a shaft driving the fan, such as the LP shaft 109), or can be a variable pitch turbine engine (e.g., including a fan 150 having a plurality of fan blades 152 rotatable about their respective pitch axes), etc. Further, still, in alternative embodiments, aspects of the present disclosure can be incorporated into, or otherwise utilized with, any other type of engine, such as reciprocating engines.

FIG. 3 is a schematic view of the fuel system 200. Features of the fuel system 200 are also schematically shown in FIG. 2. The fuel system 200 can store the hydrogen fuel for the turbine engine 100 in the fuel tank 210 and deliver the hydrogen fuel to the turbine engine 100. As noted above, the turbine engine 100 is one example of a power generator that uses hydrogen fuel and the features of the fuel system 200 described can be applicable with other power generators, such as fuel cells. The fuel system 200 delivers the hydrogen fuel to the turbine engine 100 via a fuel delivery assembly 202. The fuel delivery assembly 202 includes tubes, pipes, and the like, to fluidly connect the various components of the fuel system 200 to the turbine engine 100. The fuel tank 210 can be configured to hold the hydrogen fuel at least partially within the liquid phase and can be configured to provide hydrogen fuel to the fuel delivery assembly 202 substantially completely in the liquid phase, such as completely in the liquid phase. For example, the fuel tank 210 can have a fixed volume and contain a volume of the hydrogen fuel in the liquid phase (liquid hydrogen fuel). As the fuel tank 210 provides hydrogen fuel to the fuel delivery assembly 202 substantially completely in the liquid phase, the volume of the liquid hydrogen fuel in the fuel tank 210 decreases and the remaining volume in the fuel tank 210 is made up by, for example, hydrogen in the gaseous phase (gaseous hydrogen).

To store the hydrogen fuel substantially completely in the liquid phase, the hydrogen fuel is stored in the fuel tank 210 at very low (cryogenic) temperatures. For example, the hydrogen fuel can be stored in the fuel tank 210 at about negative two hundred fifty-three degrees Celsius or less at atmospheric pressure, or at other temperatures and pressures to maintain the hydrogen fuel substantially in the liquid phase. The fuel tank 210 can be a cryogenic storage tank, such as a double-walled cryogenic storage tank made from known materials such as titanium, Inconel®, aluminum, or composite materials. The fuel tank 210 and the fuel system 200 can include a variety of supporting structures and components to facilitate storing the hydrogen fuel in such a manner.

The liquid hydrogen fuel is supplied from the fuel tank 210 to the fuel delivery assembly 202. The fuel delivery assembly 202 can include one or more lines, conduits, pipes, etc., configured to carry the hydrogen fuel between the fuel tank 210 and the turbine engine 100. The fuel delivery assembly 202 provides a flow path of the hydrogen fuel from the fuel tank 210 downstream to the turbine engine 100. The fuel delivery assembly 202 can also include various valves (for example, shut-off valve 204) and other components to deliver the hydrogen fuel to the turbine engine 100 that are not shown in FIG. 3. The fluid lines discussed herein, particularly, those conveying liquid hydrogen, can be vacuum jacketed pipes.

The fuel tank 210 in this embodiment is a hydrogen fuel source and the fuel delivery assembly 202 is configured to receive hydrogen fuel from the fuel tank 210 (hydrogen fuel source) and to provide the hydrogen fuel from the hydrogen fuel source to the turbine engine 100. More specifically, the fuel delivery assembly 202 provides the hydrogen fuel from the hydrogen fuel source to a fuel input array of the power generator. As will be discussed further below, in the turbine engine 100, the fuel input array can include a fuel manifold 172 and the fuel nozzles 174. The fuel system 200 can include a shut-off valve 204, located, for example, in the pylon 18 or at another location between the fuel tank 210 and the turbine engine 100 that can be used to isolate and to disconnect the fuel tank 210 from the components of the fuel delivery assembly 202 that are downstream of the shut-off valve 204. The shut-off valve 204 can, thus, be positioned to isolate the components of the fuel system 200 that are located in the turbine engine 100 from the components of the fuel system 200 located in the remaining portion of the aircraft 10.

The hydrogen fuel is delivered to the turbine engine 100 by the fuel delivery assembly 202 in the liquid phase, the gaseous phase, the supercritical phase, or both of the gaseous phase and the supercritical phase. The fuel system 200, thus, includes at least one vaporizer 220 in fluid communication with the fuel delivery assembly 202 to heat the liquid hydrogen fuel flowing through the fuel delivery assembly 202. In the embodiment shown in FIG. 3, the fuel system 200 includes two vaporizers, a primary vaporizer 221 and a secondary vaporizer 223. Each vaporizer 220 is located in the flow path of the hydrogen fuel between the fuel tank 210 and the turbine engine 100. In the embodiment shown in FIG. 3, each vaporizer 220 is located at least partially within the turbine engine 100. When located in the turbine engine 100, the vaporizers 220 can be located in the nacelle 160, such as within the nacelle compartment 161 or within the turbo-engine compartment 105, for example. The vaporizers 220 can, however, be located at other suitable locations in the flow path of the hydrogen between fuel tank 210 and the turbine engine 100. For example, the vaporizers 220 can be located external to the turbine engine 100 and located in the fuselage 12, the wing 14, or the pylon 18.

Each vaporizer 220 is in thermal communication with at least one heat source. For example, the primary vaporizer 221 can be in thermal communication with a primary heat source 225, and the secondary vaporizer 223 can be in thermal communication with a secondary heat source 227. The primary vaporizer 221 can operate once the turbine engine 100 is in a thermally stable condition and the primary heat source 225 can be waste heat from the turbine engine 100. The primary vaporizer 221 can be thermally connected to, for example, a main lubrication system, a compressor cooling air system, an active thermal clearance control system, a generator lubrication system, and/or heat exchangers located within the core air flow path 140 to extract waste heat from the turbine engine 100 to heat the hydrogen fuel. In such a manner, the primary vaporizer 221 can operate by drawing heat from the primary heat source 225 once the turbine engine 100 is capable of providing enough heat, via the primary heat source 225, to the primary vaporizer 221, in order to facilitate operation of the primary vaporizer 221.

The secondary vaporizer 223 of this embodiment is a combination start-up and trim vaporizer that can used to heat the liquid hydrogen fuel flowing through the fuel delivery assembly 202 when the primary vaporizer 221 is not sufficient to heat the hydrogen fuel. During start-up of the turbine engine 100, for example, the turbine engine 100 may not be in a thermally stable condition, so the secondary vaporizer 223 is used during start-up (or prior to start-up) to heat the hydrogen fuel instead of the primary vaporizer 221. In this example, the secondary vaporizer 223 operates as a start-up vaporizer. In another example, the primary vaporizer 221 may not be heating the hydrogen fuel to the desired temperature and, thus, the secondary vaporizer 223 operates as a trim vaporizer to add supplemental heat to the hydrogen fuel to heat the hydrogen fuel to the desired temperature. Such a condition can occur when, for example, the heat provided by the primary heat source 225 to the primary vaporizer 221 is not sufficient to heat the hydrogen fuel to the desired temperature.

The secondary vaporizer 223 is thermally coupled to a secondary heat source 227. With the secondary vaporizer 223 operating as a combination start-up and trim vaporizer, the secondary heat source 227 can be a heat source external to the turbine engine 100 that can provide heat for the secondary vaporizer 223 independent of whether or not the turbine engine 100 is running and can be used, for example, during start-up (or prior to start-up) of the turbine engine 100. The secondary heat source 227 can include, for example, an electrical power source, a catalytic heater or burner, and/or a bleed airflow from an auxiliary power unit. The secondary heat source 227 can be integral to the secondary vaporizer 223, such as when the secondary vaporizer 223 includes one or more electrical resistance heaters, or the like, that are powered by the electrical power source.

As noted above, the vaporizers 220 can be thermally coupled to any suitable heat source. For example, the primary vaporizer 221, the secondary vaporizer 223, or both, can be thermally coupled to both waste heat from the turbine engine 100 and a heat source external to the turbine engine 100. In the embodiment shown in FIG. 3, the primary vaporizer 221 and the secondary vaporizer 223 are located in series relative to the flow of hydrogen in the fuel delivery assembly 202, with the secondary vaporizer 223 being downstream from the primary vaporizer 221. Other arrangements of the primary vaporizer 221 and the secondary vaporizer 223 can be used, however, such as the primary vaporizer 221 and the secondary vaporizer 223 being arranged parallel to each other.

The fuel delivery assembly 202 also includes a pump 230 to induce or to pressurize the flow of the hydrogen fuel through the fuel delivery assembly 202 to the turbine engine 100. The pump 230 can be the primary source of pressure rise in the fuel delivery assembly 202 between the fuel tank 210 and the turbine engine 100. The pump 230 can be configured to increase a pressure in the fuel delivery assembly 202 to a pressure greater than a pressure within a combustion chamber 124. The pump 230 can be located within the flow of hydrogen fuel in the fuel delivery assembly 202 at a location upstream of the primary vaporizer 221. The pump 230 can be located external to the fuselage 12 and the wing 14, such as being located at least partially within the pylon 18 or at least partially within the turbine engine 100. More specifically, the pump 230 can be located within the turbine engine 100. With the pump 230 located in such a position, the pump 230 can be a liquid pump configured to receive the flow of hydrogen fuel in a substantially completely liquid phase and pump the liquid hydrogen fuel. The pump 230 can be a cryogenic liquid pump. In other embodiments, however, the pump 230 can be located at other positions within the flow path of the hydrogen fuel. For example, the pump 230 can be located downstream of the primary vaporizer 221 and can be configured to receive the flow of hydrogen fuel through the fuel delivery assembly 202 in a substantially completely gaseous phase or a supercritical phase.

The fuel system 200 also includes a fuel metering unit in fluid communication with the fuel delivery assembly 202.

For example, the fuel metering unit can be a fuel metering valve 240 located downstream of the vaporizers 220 and the pump 230. The fuel metering valve 240 is configured to receive hydrogen fuel in a substantially completely gaseous phase or in a substantially completely supercritical phase. The fuel metering valve 240 provides the flow of fuel to the turbine engine 100 in a desired manner. More specifically, as depicted schematically in FIG. 3, the fuel metering valve 240 is configured to provide a desired volume of hydrogen fuel at, for example, a desired flow rate to a fuel manifold 172 of the turbine engine 100. The fuel manifold 172 then distributes (provides) the hydrogen fuel received to a plurality of fuel nozzles 174 within the combustion section 120 of the turbine engine 100, where the hydrogen fuel is mixed with compressed air and the mixture of the hydrogen fuel and the compressed air is combusted to generate combustion gases that drive the turbine engine 100 as discussed. Adjusting the fuel metering valve 240 changes the volume of the fuel provided to the combustion section 120 of the turbine engine 100 and, thus, changes the amount of propulsive thrust produced by the turbine engine 100 to propel the aircraft 10.

As discussed above, the hydrogen fuel used in the turbine engine 100 and in the fuel system 200 can be substantially pure hydrogen molecules (diatomic hydrogen). As diatomic hydrogen is the smallest molecule known to exist, hydrogen can be difficult to contain, particularly, in the gaseous form. Hydrogen, when in a gaseous form, also tends to seep through materials and attachment points between components, without leaving residue. The hydrogen is prone to leak through conventional seals and other small orifices such as cracks that may form over time in the fuel system 200. As noted above, portions of the fuel system 200 can be located in various compartments of the aircraft 10, the turbine engine 100, or both. As depicted in FIG. 2, for example, components of the fuel system 200 can be located within the nacelle compartment 161, the turbo-engine compartment 105, or both. For example, positions of the fuel delivery assembly 202 are shown as being located within the nacelle compartment 161, and the vaporizer 220, the pump 230, and the fuel metering valve 240 are depicted as being located within the turbo-engine compartment 105. Each of these components can be examples of a hydrogen fuel component that has a hydrogen fuel passage for hydrogen fuel to flow therethrough. If a hydrogen leak occurs in the hydrogen fuel component, the hydrogen can accumulate in a hydrogen accumulation region within the compartments, such as the nacelle compartment 161 or the turbo-engine compartment 105. Accumulation can occur, particularly, in compartments that are not vented or in compartments that are vented under conditions of low airflow, such as, for example, when the aircraft 10 is stationary or moving at low speeds (e.g., taxiing). The accumulation can be problematic. For example, hydrogen can damage components, regardless of the material class including, metallic components, polymeric components, and ceramic components. When exposed to hydrogen, certain components can be, for example, subject to hydrogen embrittlement, including hydride embrittlement, to high temperature hydrogen attack, to hydrogen blistering, and to hydrogen stress corrosion cracking.

To prevent the hydrogen from accumulating in the compartment (e.g., the nacelle compartment 161 or the turbo-engine compartment 105) and to protect components from hydrogen damage, such as from mechanisms discussed above, a hydrogen storage structure that includes a hydrogen storage material can be located in the compartment, as will be discussed further below. The hydrogen storage material has a morphology for retaining hydrogen within the hydrogen storage material. The hydrogen storage material can retain hydrogen by, for example, chemisorption, physisorption, or a combination thereof. Chemisorption of hydrogen atoms into the hydrogen storage material can occur after cleavage of the hydrogen-hydrogen bond in diatomic hydrogen. Chemisorption includes the adsorption of atomic hydrogen to the hydrogen storage material surface or absorption of atomic hydrogen into the hydrogen storage material matrix (internal material). Physisorption can be physical adsorption of diatomic hydrogen to the material surface, such as through Van der Waals interactions. The hydrogen storage material can have a hydrogen storage capacity measured as the equilibrium mass of hydrogen retained in the hydrogen storage material per unit mass of the hydrogen storage material at a given temperature when the hydrogen storage material is in contact with a concentration of diatomic hydrogen in air or an inert gas (e.g., diatomic nitrogen or argon) at one atmosphere of pressure.

The hydrogen storage material can be a reversable hydrogen storage material that both stores and releases hydrogen. Reversible hydrogen storage is driven by temperature change. The reversable hydrogen storage material has a desorption temperature. Below the desorption temperature, the reversable hydrogen storage material adsorbs or absorbs hydrogen, as discussed above. Above the desorption temperature, the reversable hydrogen storage material reverses the uptake process, and releases the hydrogen from the hydrogen storage material. The uptake of total hydrogen into the reversable hydrogen storage material increases until either an equilibrium concentration is reached or the desorption temperature for the reversable hydrogen storage material is reached. Once the desorption temperature is reached, the reversable hydrogen storage material releases the hydrogen stored therein. If equilibrium is attained, the desorption temperature must still be reached to release the hydrogen from the reversible hydrogen storage material, but the reversible hydrogen storage material cannot store any more hydrogen past the equilibrium point. The temperature required for hydrogen desorption is unique to the material system and is controlled by the binding energy of the hydrogen to the material. Hydrogen storage materials relying on physisorption can have a lower binding (e.g., a binding energy of less than 10 kJ/mol), while hydrogen storage materials relying on chemisorption can have a higher binding (i.e., a binding energy greater than 10 kJ/mol). Depending on the reversable hydrogen storage material, the reversable hydrogen storage material may support multiple reaction steps as the hydrogen storage material uptakes and releases hydrogen, as seen, for example, in complex hydride material systems. The material selection is unique to the design application of intended use. An example application is in the engine undercowl region near the combustor module where the local temperature difference between low ventilation flow conditions and high ventilation flow conditions may vary by approximately one hundred degrees Fahrenheit (100° F.). The hydrogen storage system material is selected and sized to absorb hydrogen at low ventilation flow conditions and then to desorb hydrogen at the high ventilation flow conditions, when temperatures have increased by approximately one hundred degrees Fahrenheit (100° F.), crossing the desorption temperature threshold of the designated material. The reversable hydrogen storage material can have a first hydrogen storage capacity at a first temperature and a second hydrogen storage capacity at a second temperature. The second temperature is different from the first temperature and the second hydrogen storage capacity is less than the first hydrogen storage capacity, so that the hydrogen storage material can release the stored hydrogen at the second temperature. The second temperature can be greater than the first temperature.

Additionally, or alternatively, the first hydrogen storage capacity and the second hydrogen storage capacity can be based on the partial pressure of the diatomic hydrogen in the atmosphere surrounding the hydrogen storage material, which may be referred to herein as an environmental concentration of diatomic hydrogen. Hydrogen storage capabilities as a function of partial pressure is unique to the selected material. Increasing the environmental partial pressure of the hydrogen in the environment favors hydrogen adsorption to the surface of the hydrogen storage material until the equilibrium point of the materials capacity to adsorb hydrogen. Maximum allowable hydrogen adsorption capacity is dependent on the material characteristics like surface morphology, microstructure, surface kinetics, pore volume, available surface area, etc. Decreasing environmental partial pressure of hydrogen facilitates desorption of hydrogen from the surface of the hydrogen storage material surface. The same relationship can be true for hydrogen absorption, increasing the partial pressure of hydrogen increases the rate of hydrogen absorption up until an equilibrium point. Decreasing environmental partial pressure of hydrogen facilitates desorption of hydrogen from the hydrogen storage material. The first hydrogen storage capacity of the reversable hydrogen storage material can be at a first environmental concentration of diatomic hydrogen, and the second hydrogen storage capacity of the reversable hydrogen storage material can be at a second environmental concentration of diatomic hydrogen. The first environmental concentration of diatomic hydrogen can be different from the second environmental concentration of diatomic hydrogen and the second hydrogen storage capacity is less than the first hydrogen storage capacity so that the hydrogen storage material can release the stored hydrogen at the second temperature. The first environmental concentration of diatomic hydrogen can be greater than the second environmental concentration of diatomic hydrogen.

Hydrogen storage capacity is unique to the material system and the binding mechanism in which the hydrogen adsorbs to the material surface or absorbs into the material matrix. For example, hydrogen storage materials, intended for use in cryogenic applications up to ambient conditions, can rely on physisorption to store hydrogen and may uptake up to five weight percent of hydrogen, depending on many factors, not limited to surface morphology, microstructure, surface kinetics, pore volume, available surface area, etc. Some non-limiting examples of hydrogen storage materials for cryogenic temperature to ambient temperature ranges include metal organic frameworks, zeolites, carbon frameworks, such as graphene networks and doped multi-wall carbon nanotubes. Alternatively, hydrogen storage materials intended for applications with more elevated temperatures, ranging from ambient temperature to greater than one thousand degrees Fahrenheit, can rely on chemisorption, and supporting absorption of hydrogen may take up to eighteen and five tenths weight percent of hydrogen, depending on many factors, not limited to composition, microstructure, absorption kinetics, material stability, doping agents, etc. Some non-limiting examples of hydrogen storage materials for elevated temperature ranges include complex metal hydrides with foundations from lithium hydrides, magnesium hydrides, borohydrides, and alanates.

As noted above, the hydrogen fuel can be stored and conveyed in liquid form. Accordingly, the components (e.g., the components upstream of the vaporizer 220) and operating temperatures of these components may be at cryogenic temperatures. In these cryogenic applications, the hydrogen storage material can be a cryogenic hydrogen storage material such as a metal organic framework, a zeolite, a carbon framework, or combinations thereof. The carbon framework can be a graphene network or a framework of doped multi-wall carbon nanotubes. At cryogenic temperatures from negative four hundred fifty-three degrees Fahrenheit to from negative three hundred degrees Fahrenheit, adsorption and desorption of hydrogen from the hydrogen storage materials requires a small difference in temperature, due to the weaker forces and the lesser binding energy of the hydrogen to the surface of the material. During normal operation, the cryogenic system is expected to maintain a design temperature below negative three hundred degrees Fahrenheit to absorb and to store hydrogen in the hydrogen storage material with the option to cross the desorption temperature threshold, to release the hydrogen from the hydrogen storage material, while not in normal operation. The desorption temperature of the hydrogen storage material is unique to the selected hydrogen storage material that is required to overcome to the binding energy of the hydrogen, to adhere to the surface of the material paired with the surface morphology of the material. For cryogenic applications with design temperature below negative three hundred degrees Fahrenheit, the cryogenic hydrogen storage material can adsorb (or absorb) hydrogen at a temperature less than negative three hundred degrees Fahrenheit and the desorption temperature can be from negative two hundred degrees Fahrenheit to zero degrees Fahrenheit.

In a potential application where the temperature of interest is greater than negative three hundred degrees Fahrenheit to ambient temperature, chemisorption surface adherence mechanism becomes the primary driver for binding mechanisms, favoring carbon networks such as graphene networks and doped multi-wall carbon nanotube networks. The hydrogen uptake (in terms of weight percent) is unique to each material type and influenced by design factors, such as but not limited to, surface morphology, microstructure, pore volume, available surface area, etc.

In other applications, the temperatures may be higher, including temperatures above ambient temperatures, such as above three hundred degrees Fahrenheit. In these higher temperature applications, the hydrogen storage materials can be a high temperature hydrogen storage material such as complex metal hydrides with foundations from lithium hydrides, magnesium hydrides, borohydrides, and alanates. The high temperature hydrogen storage material can adsorb hydrogen at temperatures from three hundred degrees Fahrenheit to eight hundred fifty degrees Fahrenheit and that has a desorption temperature from three hundred fifty degrees Fahrenheit to one thousand seven hundred degrees Fahrenheit. The desorption temperature can vary by material, such as the complex metal hydrides with foundations from lithium hydrides, magnesium hydrides, borohydrides, and alanates. For example, lithium hydrides can have a desorption temperature from one thousand two hundred fifty degrees Fahrenheit to one thousand seven hundred degrees Fahrenheit. Magnesium hydrides can have a desorption temperature from five hundred fifty degrees Fahrenheit to eight hundred fifty degrees Fahrenheit. Borohydrides can have a desorption temperature from six hundred degrees Fahrenheit to one thousand two hundred degrees Fahrenheit. Alanates can have a desorption temperature from three hundred fifty degrees Fahrenheit to five hundred fifty degrees Fahrenheit An example application is in the engine undercowl region near the combustor module where ground idle conditions and other low ventilation conditions allow for the absorption of hydrogen during operation. Thermal input to the hydrogen storage material from engine operation in higher power and ventilation conditions allows for the desorption of the hydrogen from the hydrogen storage material after crossing the desorption temperature threshold of the designated material. The hydrogen uptake weight percent is unique to each material type and influenced by design factors such as but not limited to material composition, microstructure, absorption kinetics, material stability, doping agents, etc.

The hydrogen storage material can be an irreversible hydrogen storage material, such as by utilizing material selection and design temperature ranges that prohibit the engine conditions from reaching the desorption threshold of the material in both cryogenic and elevated temperature applications as described above. The selected hydrogen storage material would exhibit a desorption temperature higher than that of all potential engine operating conditions in its intended engine locations and design use. For example, in cryogenic temperature applications, at the normal engine operating conditions, the cryogenic fuel system will not exhibit large temperature differences in order to maintain the desired hydrogen fuel phase. Therefore, the hydrogen storage material would be selected to store hydrogen only and would allow for release of hydrogen during non-normal operations. Alternatively, in elevated temperature applications, the selected hydrogen storage material would exhibit a desorption temperature outside of the normal operating envelope in the undercowl. Therefore, the hydrogen storage material would require removal from the engine and external thermal input to release the stored hydrogen.

The hydrogen storage material can be arranged relative to the hydrogen fuel component in several different arrangements. These arrangements will be discussed in more detail below with reference to FIGS. 4A to 6D. In general, the hydrogen fuel component can be located within a housing. More specifically, the housing defines a volume that is at least partially enclosed. If a hydrogen leak occurs in the hydrogen fuel component, the hydrogen leaking from the hydrogen fuel component has a hydrogen leak path within the volume of the housing, a hydrogen accumulation region within the volume of the housing, or both. The hydrogen leak path and the hydrogen accumulation region can be defined within the volume of the housing. The hydrogen storage material can be part of a hydrogen storage structure that is located within the volume of the housing in at least one of the hydrogen leak paths or the hydrogen accumulation region so that the hydrogen storage materials are exposed to hydrogen if the hydrogen leak occurs.

Figure 4A:
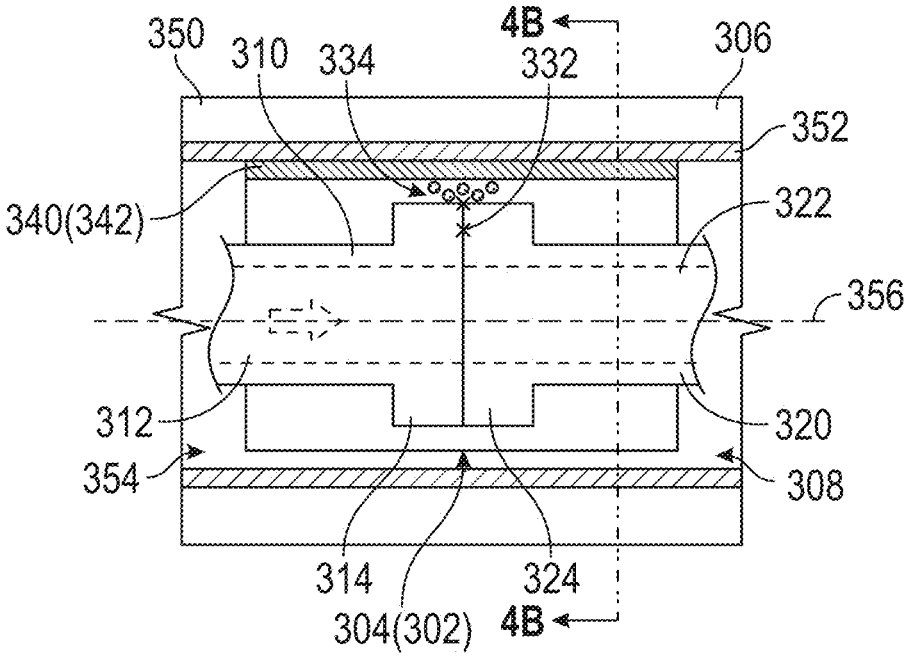
FIGS. 4A and 4B are cross-sectional views of a hydrogen fuel component located within a housing.
Figure 4B:
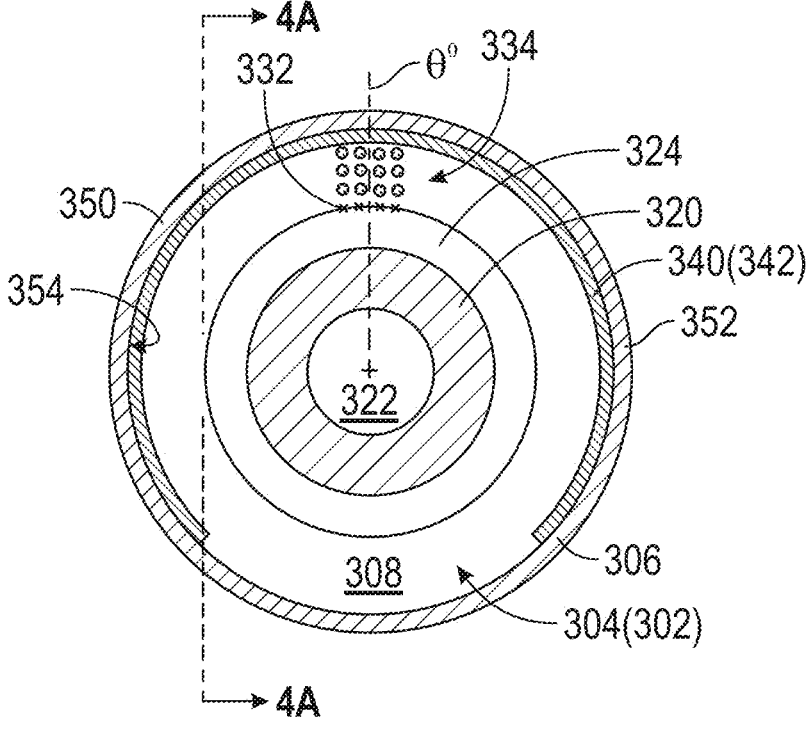

FIGS. 4A and 4B are cross-sectional views of a hydrogen fuel component 302 located within a housing 306 showing one arrangement of the hydrogen storage material. FIG. 4A is taken along line 4A-4A in FIG. 4B, and FIG. 4B is taken along line 4B-4B in FIG. 4A. As noted above, the hydrogen fuel component 302 can be any one of the components of the fuel system 200 discussed above, such as portions of the fuel delivery assembly 202, the shut-off valve 204, the fuel tank 210, the vaporizers 220, the pump 230, the fuel metering valve 240, the fuel manifold 172, or the fuel nozzles 174. The hydrogen fuel components 302 depicted in FIGS. 4A and 4B are portions of the fuel delivery assembly 202. More specifically, FIG. 4A shows a joint, such as a flange joint 304, formed between a first fuel line 310 and a second fuel line 320. The hydrogen fuel component 302 can be the flange joint 304. Each of the first fuel line 310 and second fuel line 320 includes a hydrogen fuel passage for the hydrogen fuel to flow therethrough. The first fuel line 310 includes a first hydrogen fuel passage 312 and the second fuel line 320 includes a second hydrogen fuel passage 322. The first hydrogen fuel passage 312 and the second hydrogen fuel passage 322 are shown in broken lines in FIG. 4A.

Each of the first fuel line 310 and the second fuel line 320 can also include a flange located on one end. The first fuel line 310 can include a first flange 314 and the second fuel line 320 can include a second flange 324. Joining surfaces of each of the first flange 314 and the second flange 324 can be positioned to abut each other. The first flange 314 and the second flange 324 can also be fastened using a suitable fastener, such as a bolt (not shown), or otherwise joined to each other. With the first fuel line 310 joined to the second fuel line 320, the first hydrogen fuel passage 312 and the second hydrogen fuel passage 322 can be arranged to align with each other and to form a continuous hydrogen fuel flow path.

Joints, such as the flange joint depicted in FIGS. 4A and 4B, can be particularly susceptible to leakage. For example, hydrogen may leak from the first hydrogen fuel passage 312, the second hydrogen fuel passage 322, or both, by leaking between the abutting surfaces of the first flange 314 and the second flange 324. A hydrogen leak 332 is schematically represented by an "X" in FIGS. 4A and 4B. As the hydrogen leaks from the hydrogen fuel component 302, such as the flange joint 304, the hydrogen flows in a hydrogen leak path 334 (as schematically illustrated by dots).

As noted above, the hydrogen fuel component 302 can be located within a housing 306. The housing 306 defines a volume 308 that is at least partially enclosed. The hydrogen fuel component 302 is located within the volume 308. In this embodiment, the housing 306 is an enclosure that is positioned around the hydrogen fuel component 302, such as in close proximity to the hydrogen fuel component 302, to locate the hydrogen storage material 340 in close proximity to the hydrogen fuel component 302. Close proximity can be locating the hydrogen storage material 340 in a potential leakage path of hydrogen from a potential leakage source of the hydrogen fuel component 302 to control hydrogen concentration within the volume 308, over a range of operating conditions. The housing 306 shown in FIGS. 4A and 4B can be a shell 350 arranged at least partially around the hydrogen fuel component 302, such as the flange joint 304. The shell 350 can be a clam shell that encloses the flange joint 304 and surrounds the flange joint 304. Here, the shell 350 includes a wall 352 having an inner surface 354 facing the volume 308. The hydrogen storage material 340 can be attached to the wall 352 between the hydrogen fuel component 302 (e.g., the flange joint 304) and the shell 350. For example, the hydrogen storage material 340 can be a physical deposit formed on the inner surface 354 of the wall 352. For example, the hydrogen storage material 340 applied as a coating to the inner surface 354 of the wall 352. In such a case, a hydrogen storage structure 342 for the hydrogen storage material 340 is the coating layer. The hydrogen storage material 340 can be attached to the wall in other ways, as discussed below.

Hydrogen (e.g., diatomic hydrogen) is typically lighter than gas, such as air, which is otherwise present in the volume 308. The hydrogen in the hydrogen leak path 334, thus, generally flows upward from the hydrogen leak 332. The hydrogen storage material 340 can be located on the portion of the wall 352 of the shell 350 that is above the hydrogen fuel component 302. The hydrogen fuel component 302 discussed herein can be used onboard the aircraft 10 (FIG. 1) such as within the turbine engine 100 (FIG. 2) of the aircraft 10. During operation, the attitude of the aircraft 10, the turbine engine 100, and, thus, the hydrogen fuel component 302 can change during the flight. For example, the aircraft 10 can have a pitch during takeoff and landing, and have a roll during turns. Accordingly, the upper portions of the wall 352 of the shell 350 can change during flight. The hydrogen storage material 340 can be applied to the inner surface 354 of the wall 352 over a range to account for these changes in attitude. For example, the inner surface 354 of the wall 352 can be an arcuate surface around a shell centerline axis 356. The hydrogen storage material 340 can be located over an angular range around the shell centerline axis 356. The angular range can be at least forty-five degrees, such as at least ninety degrees. It is not necessary for the hydrogen storage material 340 to circumscribe the hydrogen fuel component 302 (e.g., the flange joint 304), and the hydrogen storage material 340 can partially surround the hydrogen fuel component 302 (e.g., the flange joint 304). For example, the angular range can be less than or equal to two hundred seventy degrees, such as less than or equal to one hundred eighty degrees, and even less than or equal to ninety degrees. For example, the hydrogen storage material 340 can be located over a range from forty-five degrees to two hundred seventy degrees around the shell centerline axis 356, from forty-five degrees to one hundred eighty degrees around the shell centerline axis 356, or from forty-five degrees to ninety degrees around the shell centerline axis 356. In other examples, the hydrogen storage material 340 can be located over a range from ninety-degrees to two hundred seventy degrees around the shell centerline axis 356 or from ninety-degrees to one hundred eighty degrees around the shell centerline axis 356. These ranges are preferably on the upper portion of the shell 350 above the hydrogen fuel component 302 (e.g., the flange joint 304). As noted above, upper and above can be taken relative to an assembled or a ground idle condition of the aircraft 10 or turbine engine 100. The hydrogen storage material 340 can be coated on either side of a twelve o'clock position ("0°" in FIG. 4B) of the shell 350 above the shell centerline axis 356. The hydrogen storage material 340 can be coated equidistantly on either side of the twelve o'clock position.

Figure 5:
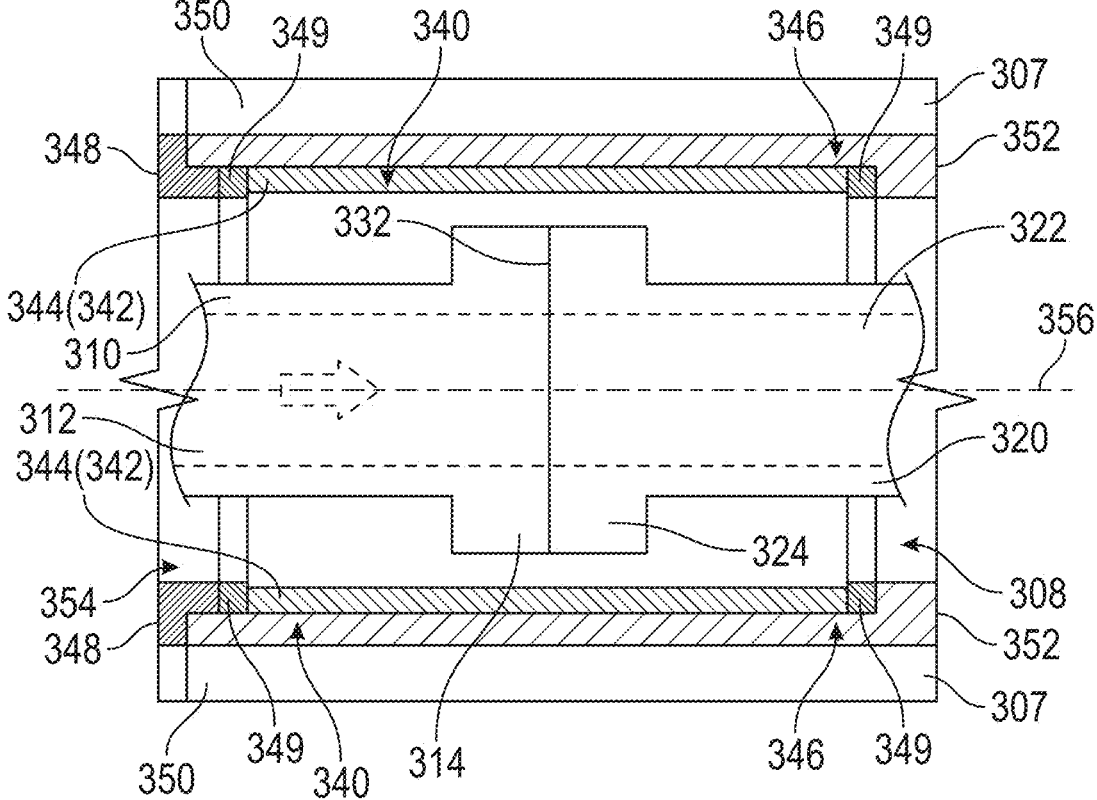
FIG. 5 is a cross-sectional view, taken from a perspective similar to that of FIG. 4A, of the hydrogen fuel component located within a housing with an alternate means of attaching a hydrogen storage structure thereto.

FIG. 5 is a cross-sectional view of the hydrogen fuel component 302 located within a housing 307 with an alternate hydrogen storage structure 342 for the hydrogen storage material 340. The housing 307 is similar to the housing 306 discussed above with reference to FIGS. 4A and 4B, and the same reference numerals will be used for the same or similar components. As noted above the hydrogen storage material 340 can be attached to the wall in ways other than coatings. For example, the hydrogen storage structure 342 can be a cartridge 344, which is fastened or otherwise attached to the inner surface 354 of the wall 352. The cartridge 344 can be a removable cartridge (e.g., a removable structure) allowing the hydrogen storage material 340 to be removed from the housing 307 and replaced. The cartridge 344 can be a solid piece of the hydrogen storage material 340, as depicted in FIG. 5, but the cartridge 344 can have additional structure to retain the hydrogen storage material 340 therein.

As depicted in FIG. 5, for example, the housing 307 can include a groove 346 in which the cartridge 344 and the hydrogen storage material 340 can be positioned. The cartridge 344 and the hydrogen storage material 340 can be retained in the groove 346 by various retention features. A removeable ring 348, can be used to open and close the groove 346, allowing the cartridge 344 and the hydrogen storage material 340 to be removed and inserted into the groove 346. The ring 348 can be a threaded ring with threads that engage with threads of the housing 307 or a bolted ring that bolts to the housing 307. To securely retain the cartridge 344 and the hydrogen storage material 340 in the groove 346, one or both ends of the groove 346 can have springs 349 that bear upon the cartridge 344 and sidewalls of the groove 346.

FIGS. 6A to 6D are schematic views of a compartment that can have the hydrogen fuel component 302 located therein. Each of these compartments includes a hydrogen storage material 360, and FIGS. 6A to 6D each show different arrangements of the hydrogen storage material 360 within the compartment. Each of the compartments shown in FIGS. 6A to 6D can be, for example, the turbo-engine compartment 105 (FIG. 2) or the nacelle compartment 161 (FIG. 2). The following discussion will refer to certain features of the turbo-engine compartment 105, but this discussion is applicable to other compartments of the turbine engine 100 (FIG. 2) or aircraft 10 (FIG. 1). Features of the compartments discussed in FIGS. 6A to 6D are similar to those discussed above, with respect to the shell 350, and the same reference numerals are used in FIGS. 6A to 6D for the same or similar components. Similarly, the same or similar components in FIGS. 6A to 6D are given the same reference numeral and the discussion in one figure applies to the others, unless otherwise noted. Although described separately, one or more of the arrangements described below can be used together. Likewise, the shell 350 (FIGS. 4A and 4B) shown above can be used on one or more of the hydrogen fuel components 302 located with any one of the compartments.

Figure 6A:
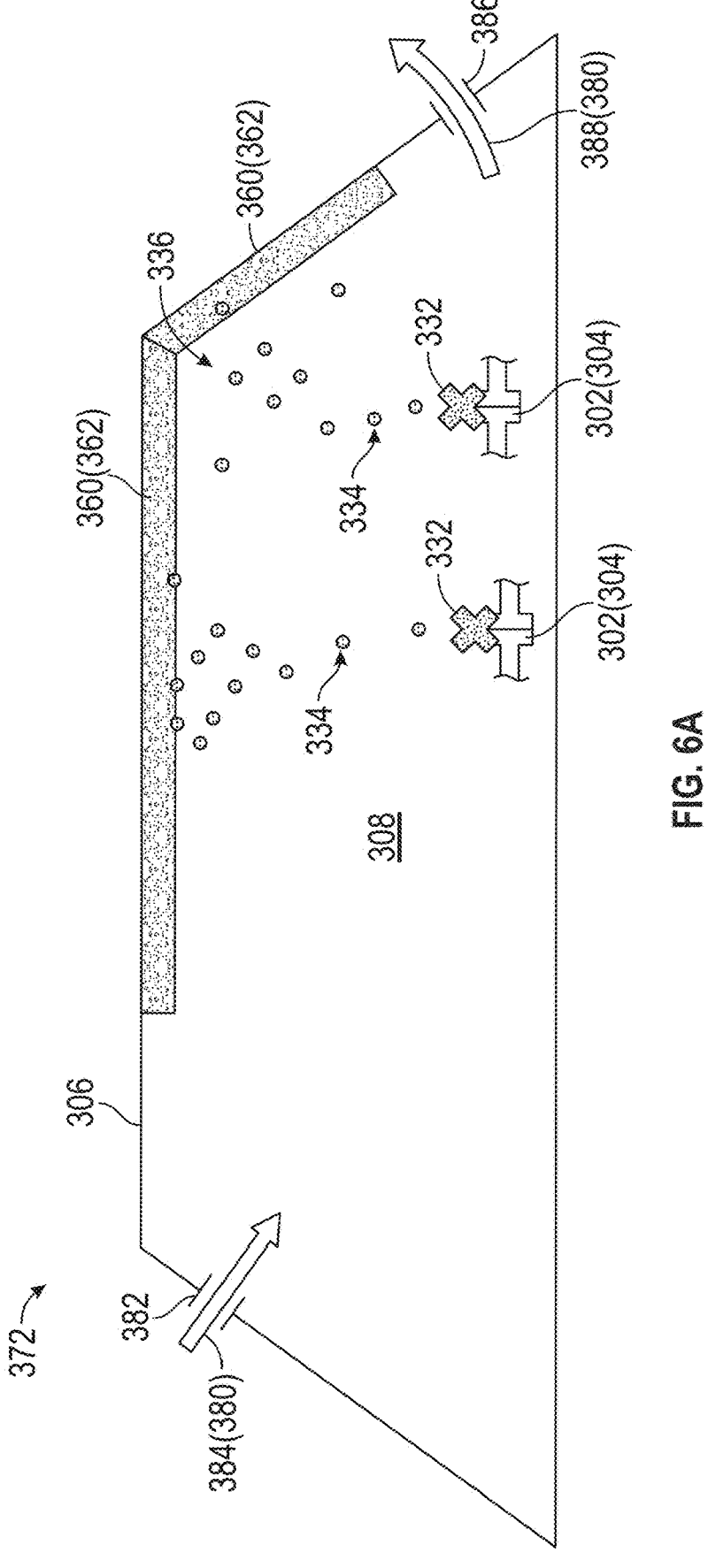
FIGS. 6A, 6B, 6C, and 6D are schematic views of a compartment of an aircraft or a turbine engine having a hydrogen fuel component and a hydrogen storage structure located therein.

FIG. 6A shows a first compartment 372 with an arrangement of the hydrogen storage material 360 therein. At least a portion of the first compartment 372 is the volume 308 and the housing 306 defines at least a portion of the first compartment 372. When the first compartment 372 is the turbo-engine compartment 105, the housing 306 can be the outer casing 106 or a portion thereof, for example. Similarly, when the first compartment 372 is the nacelle compartment 161, the housing 306 can be the nacelle 160 or a portion thereof, for example.

FIG. 6A depicts two hydrogen fuel components 302, each with a hydrogen leak 332. As the hydrogen leaks into the first compartment 372, the hydrogen may accumulate in one or more hydrogen accumulation regions 336 within the volume 308. The hydrogen storage material 360 can be placed (as part of a hydrogen storage structure 362) in the hydrogen accumulation regions 336 so that the hydrogen storage material 360 is exposed to hydrogen from the hydrogen leak 332. As shown in FIG. 6A, the hydrogen storage material 360 can be placed at an upper portion of the first compartment 372, such as a wall defining an upper portion of the first compartment 372. At least a portion of the hydrogen storage material 360 can be located above each hydrogen fuel component 302 within the first compartment 372.

The first compartment 372 can be vented (e.g., a vented compartment) to have a vent fluid 380 flow therethrough. The vent fluid 380 can be a gas. The vent fluid 380 can be air, such as when the first compartment 372 can be vented to atmosphere, but vent fluid 380 can be other fluids, such as an inert gas, like nitrogen or argon, for example. The first compartment 372 can include one or more inlets 382 with an inlet vent-fluid flow 384 of the vent fluid 380 flowing into the first compartment 372. The vent fluid 380 then flows through the first compartment 372 and then out one or more outlets 386, as an outlet vent-fluid flow 388. The flow of the vent fluid 380 can impact the hydrogen leak paths 334 from the hydrogen leaks 332 and, thus, also can impact the location of the hydrogen accumulation regions 336. The hydrogen storage material 360 can be located within the compartment to account for different flows of the vent fluid 380, such as, for example, positioning the hydrogen storage material 360 on a downstream wall of the housing 306 relative to the flow of the vent fluid 380 through the first compartment 372.

In the first compartment 372, shown in FIG. 6A, the hydrogen storage material 360 is located over relatively large sections of the housing 306, such as a majority of an upper wall and a majority of a downstream wall.

Figure 6B:
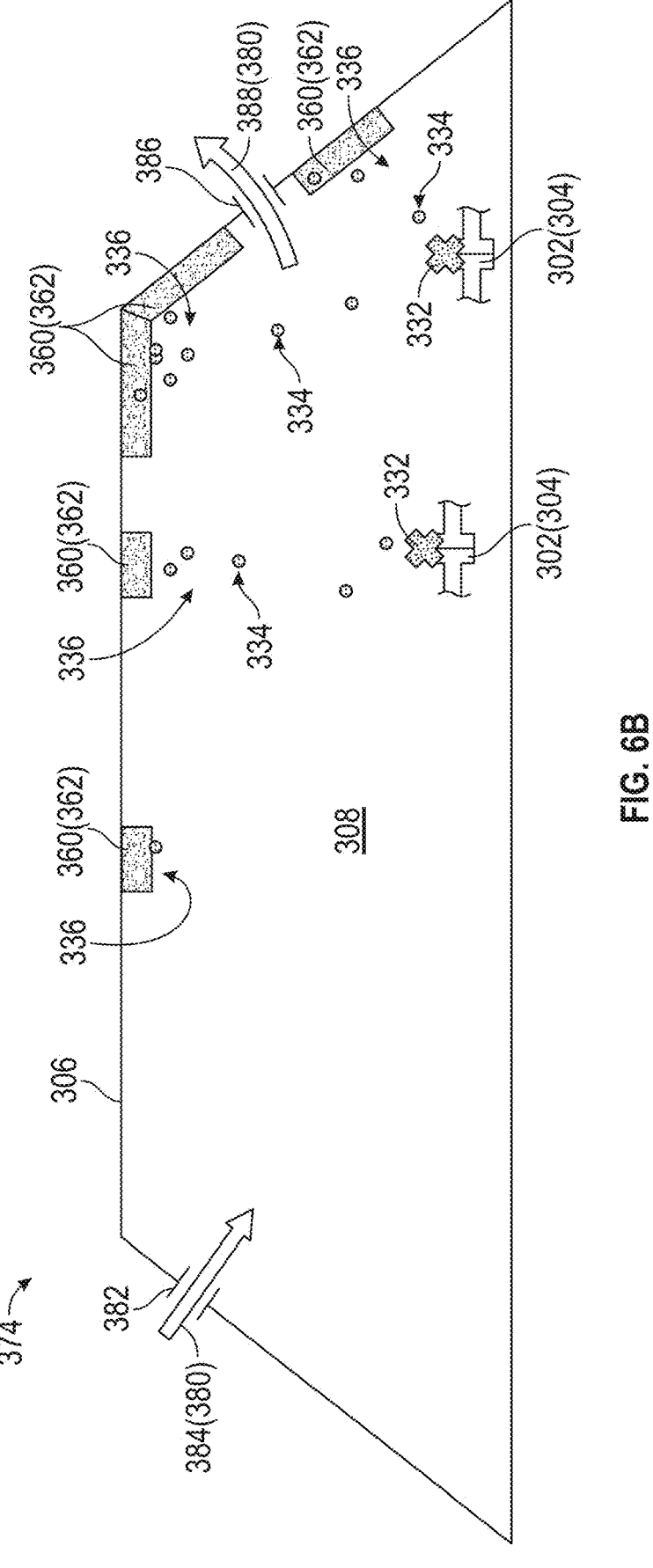

FIG. 6B shows a second compartment 374 with another arrangement of the hydrogen storage material 360 therein. As noted above, the hydrogen storage material 360 can be positioned over large sections of the housing 306. In other cases, the hydrogen accumulation regions 336 can be more limited. The second compartment 374 can include, for example, a plurality of hydrogen accumulation regions 336. Each hydrogen accumulation region 336 can be discrete from each other. A hydrogen storage material 360 can be located in each one of the hydrogen accumulation regions 336.

Figure 6C:
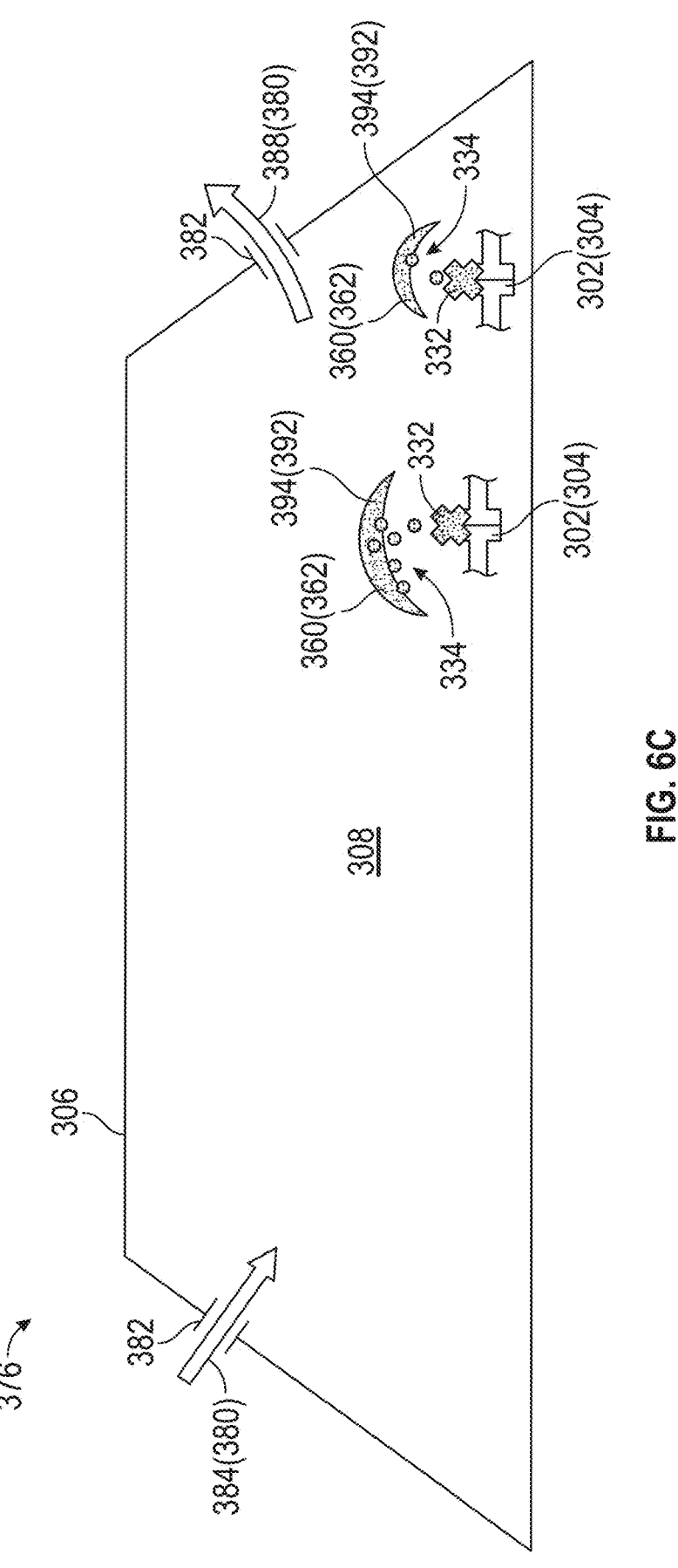
Figure 6D:
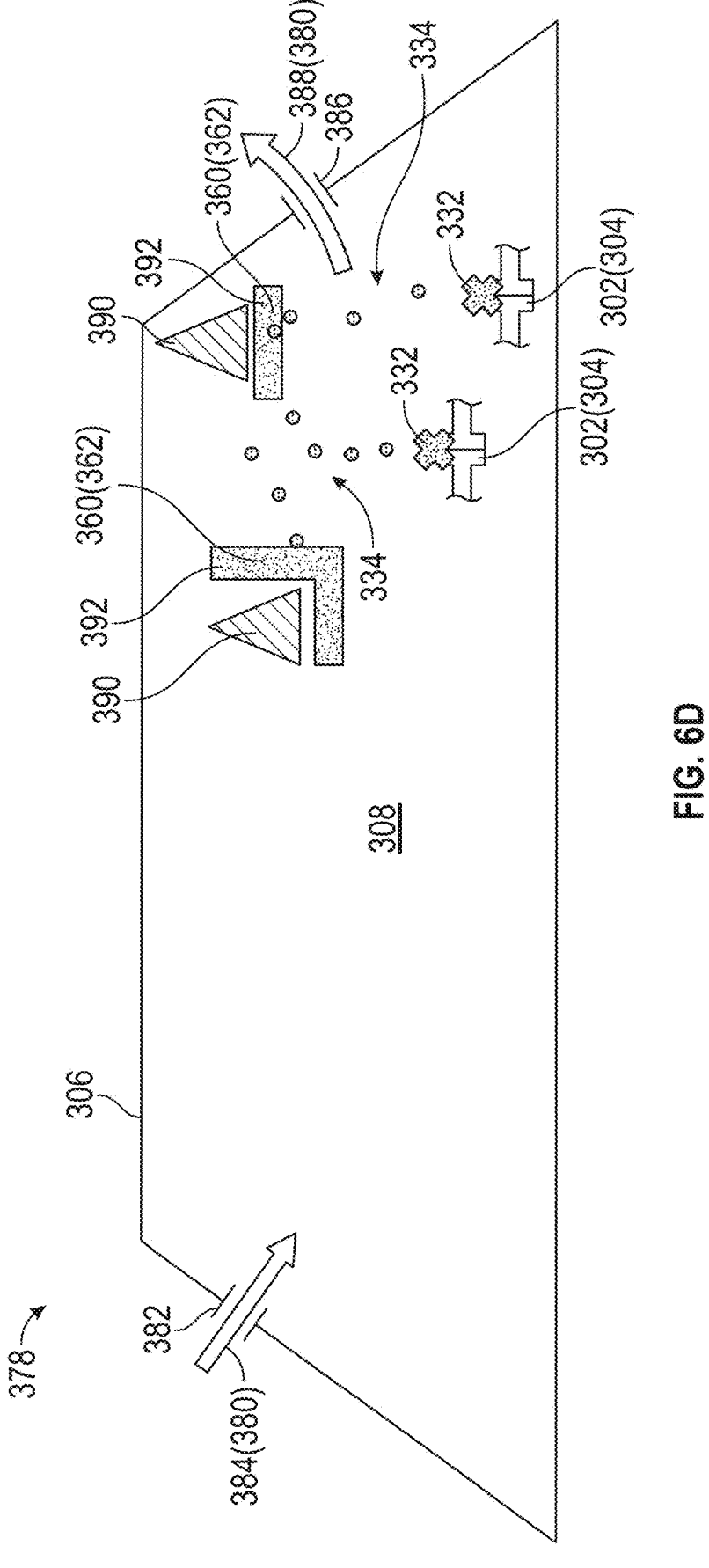

FIG. 6C shows a third compartment 376 with another arrangement of the hydrogen storage material 360 therein. In FIGS. 6A and 6B, the hydrogen storage material 360 is located, such as attached to, the housing 306. The hydrogen storage material 360 can be located proximate to the hydrogen fuel component 302 in a manner similar to the hydrogen storage material 340 discussed above. In FIG. 6C, the hydrogen storage structure 362 for the hydrogen storage material 360 is schematically depicted as a shield 392 only partially surrounding the hydrogen fuel component 302, instead of the shell 350 that circumscribes the hydrogen fuel component 302. The shield shown in FIG. 6C is an arcuate shield 394 and can have the arcuate features and positioning of the hydrogen storage material 340 discussed above with reference to FIG. 4B.

FIG. 6C shows a fourth compartment 378 with another arrangement of the hydrogen storage material 360 therein. Additional components beyond the hydrogen fuel components 302 can be located in the fourth compartment 378. Some of these components may be hydrogen-sensitive components 390 for which additional protection from hydrogen is utilized. A hydrogen-sensitive component 390 can be a component that is sensitive to hydrogen. For example, the hydrogen-sensitive component 390 can be a component that is made from or includes materials that are sensitive to hydrogen damage including the hydrogen damage mechanisms discussed above. Other hydrogen-sensitive components 390 can be potential ignition sources, such as electrical components that can produce a spark or components that are relatively hot. Relatively hot can be within ten percent of the autoignition temperature for hydrogen gas. The autoignition temperature can vary depending upon pressure. For example, the autoignition temperature for hydrogen gas in air at fourteen and seven tenths pounds per square inch absolute can be from nine hundred thirty-two degrees Fahrenheit to one thousand seventy degrees Fahrenheit, and at pressures from two and nine tenths pounds per square inch absolute to seven and twenty-five hundredths pounds per square inch absolute, six hundred fifty-seven degrees Fahrenheit. Accordingly, "relatively hot" can be components with operating temperatures at five hundred ninety degrees Fahrenheit or greater. Because hydrogen gas has a very wide flammability range, such as from four volume percent in air to seventy-five volume percent in air, the hydrogen storage material 360 can be used to maintain the concentration of hydrogen below these levels around the hydrogen-sensitive components 390.

The hydrogen-sensitive component 390 can be spaced apart from the hydrogen fuel component 302. The hydrogen storage material 360 can be arranged as part of a shield 392, positioned between the hydrogen fuel component 302 and the hydrogen-sensitive component 390. The shield 392 can be positioned closer to the hydrogen-sensitive component 390 than to the hydrogen fuel component 302 to protect the hydrogen-sensitive component 390.

A hydrogen storage material is disclosed herein that can be used and positioned in various different ways around a hydrogen fuel component to protect against hydrogen leaks. The hydrogen storage material discussed here can be advantageous for use in aircraft and turbine engines, or other power generators using hydrogen fuel, particularly, when the operating environments change throughout the flight cycle. The hydrogen storage material discussed herein can store leaking hydrogen from hydrogen fuel components to prevent undesirable accumulation, damage of hydrogen-sensitive components, or both.

Further aspects of the present disclosure are provided by the subject matter of the following clauses.

A hydrogen fuel system for an aircraft includes a housing defining a volume that is at least partially enclosed, a hydrogen fuel component, and a hydrogen storage structure. The hydrogen fuel component has a hydrogen fuel passage for hydrogen fuel to flow therethrough. The hydrogen fuel component is located within the volume of the housing. The hydrogen storage structure includes a hydrogen storage material having a morphology for retaining hydrogen within the hydrogen storage material. A hydrogen leak path is defined within the volume of the housing, a hydrogen accumulation region is defined within the volume of the housing, or both the hydrogen leak path and the hydrogen accumulation region is defined within the volume of the housing. The hydrogen storage structure is located within the volume of the housing in at least one of the hydrogen leak path or in the hydrogen accumulation region.

The hydrogen fuel system of the preceding clause, wherein the hydrogen storage structure is a removable cartridge.

The hydrogen fuel system of any preceding clause, wherein the hydrogen storage material removes hydrogen from the volume of the housing by chemisorption, physisorption, or a combination thereof.

The hydrogen fuel system of any preceding clause, wherein the hydrogen storage material is an irreversible hydrogen storage material.

The hydrogen fuel system of any preceding clause, wherein the hydrogen storage material is a reversable hydrogen storage material that stores hydrogen and releases hydrogen, the reversable hydrogen storage material having a desorption temperature.

The hydrogen fuel system of the preceding clause, wherein the reversable hydrogen storage material is a cryogenic hydrogen storage material that adsorbs hydrogen at temperatures at or below negative three hundred degrees Fahrenheit and that has a desorption temperature from negative two hundred degrees Fahrenheit to zero degrees Fahrenheit.

The hydrogen fuel system of any preceding clause, wherein the reversable hydrogen storage material adsorbs hydrogen at temperatures from three hundred degrees Fahrenheit to eight hundred fifty degrees Fahrenheit and that has a desorption temperature from three hundred fifty degrees Fahrenheit to one thousand seven hundred degrees Fahrenheit.

The hydrogen fuel system of any preceding clause, wherein the housing is a shell arranged at least partially around the hydrogen fuel component, The hydrogen fuel system of the preceding clause, wherein the shell includes a wall having an inner surface facing the volume, and the hydrogen storage structure is attached to the inner surface of the wall.

The hydrogen fuel system of any preceding clause, wherein the inner surface of the wall being is arcuate surface around a shell centerline axis, and the hydrogen storage material is located over a range from ninety degrees to two hundred seventy degrees around the shell centerline axis.

The hydrogen fuel system of any preceding clause, wherein the hydrogen storage structure is a physical deposit of the hydrogen storage material formed on the inner surface of the wall.

The hydrogen fuel system of any preceding clause, wherein the hydrogen storage structure is a removable structure.

The hydrogen fuel system of any preceding clause, wherein the volume is at least a portion of a compartment, and the housing defines at least a portion of the compartment.

The hydrogen fuel system of any preceding clause, wherein the hydrogen storage material is located in the compartment and spaced apart from the housing.

The hydrogen fuel system of any preceding clause, wherein the hydrogen storage structure is one hydrogen storage structure of a plurality of hydrogen storage structures.

The hydrogen fuel system of the preceding clause, wherein the hydrogen accumulation region is one of a plurality of hydrogen accumulation regions located in the compartment, each hydrogen accumulation region of the plurality of hydrogen accumulation regions being discrete from each other and including one of the plurality of hydrogen storage structures.

The hydrogen fuel system of any preceding clause, further comprising a hydrogen-sensitive component located within the compartment and spaced apart from the hydrogen fuel component, the hydrogen storage structure being located between the hydrogen-sensitive component and the hydrogen fuel component.

The hydrogen fuel system of any preceding clause, wherein the compartment includes an upper wall, the hydrogen storage material being located over a majority of the upper wall.

The hydrogen fuel system of any preceding clause, wherein the compartment is a vented compartment.

The hydrogen fuel system of any preceding clause, wherein the compartment is vented to atmosphere.

The hydrogen fuel system of any preceding clause, wherein the compartment includes a downstream wall relative to the flow of a vent fluid through the compartment, and the hydrogen storage material is located over a majority of the downstream wall.

A gas turbine engine for an aircraft comprises the hydrogen fuel system of any preceding clause.

The gas turbine engine of the preceding clause, further comprising a fan, and a nacelle circumscribing the fan.

The gas turbine engine of any preceding clause, further comprising a turbo-engine. The turbo-engine including a compressor section, a combustor, and a turbine section. The compressor section includes one or more compressors to generate compressed air. The combustor is located downstream of the compressor section to receive the compressed air. The combustor includes a combustion chamber and a fuel nozzle fluidly coupled to the hydrogen fuel system to receive the hydrogen fuel from the hydrogen fuel system and to inject the hydrogen fuel into the combustion chamber, generating a fuel and air mixture. The fuel and air mixture is combusted in the combustion chamber to generate combustion products. The turbine section is located downstream of the combustor to receive the combustion products. The turbine section includes one or more turbines to be rotated by the combustion products.

The gas turbine engine of any preceding clause, wherein the nacelle has a nacelle compartment formed therein, the volume being at least a portion of the nacelle compartment, and the housing being a nacelle housing defining at least a portion of the nacelle compartment.

The gas turbine engine of nay preceding clause, wherein an outer casing encloses the turbo-engine and has a turbo-engine compartment, the volume being at least a portion of the turbo-engine compartment, and the housing being at least a portion of the outer casing.

The hydrogen fuel system of any preceding clause, wherein the hydrogen storage material is metal organic framework, a zeolite, a carbon framework, complex metal hydride, or combinations thereof.

The hydrogen fuel system of any preceding clause, wherein the hydrogen storage material is a carbon framework.

The hydrogen fuel system of the preceding clause, wherein the carbon framework is a graphene network or a framework of doped multi-wall carbon nanotubes.

The hydrogen fuel system of any preceding clause, wherein the hydrogen storage material is a complex metal hydrides.

The hydrogen fuel system of the preceding clause, wherein the complex metal hydrides has a foundation of lithium hydride, magnesium hydride, borohydride, alanate, or combinations thereof.

The hydrogen fuel system of any preceding clause, wherein the hydrogen storage material is a reversable hydrogen storage material that stores hydrogen and releases hydrogen.

The hydrogen fuel system of the preceding clause, wherein the reversable hydrogen storage material has a desorption temperature.

The hydrogen fuel system of any preceding clause, wherein the cryogenic hydrogen storage material is a metal organic framework, a zeolite, a carbon framework, or combinations thereof.

The hydrogen fuel system of any preceding clause, wherein the cryogenic hydrogen storage material is a carbon framework, the carbon framework being a graphene networks or a framework of doped multi-wall carbon nanotubes.

The hydrogen fuel system of any preceding clause wherein the high temperature hydrogen storage material is a complex metal hydride.

The hydrogen fuel system of the preceding clause wherein the complex metal hydrides has a foundation of lithium hydride, magnesium hydride, borohydride, alanate, or combinations thereof.

Although the foregoing description is directed to certain embodiments, other variations and modifications will be apparent to those skilled in the art and can be made without departing from the disclosure. Moreover, features described in connection with one embodiment can be used in conjunction with other embodiments, even if not explicitly stated above.

The invention claimed is:

1. A hydrogen fuel system for an aircraft, the hydrogen fuel system comprising:
   a housing defining a volume that is at least partially enclosed;
   a hydrogen fuel component having a hydrogen fuel passage for hydrogen fuel to flow therethrough, the hydrogen fuel component being located within the volume of the housing; and
   a hydrogen storage structure including a hydrogen storage material having a morphology for retaining hydrogen within the hydrogen storage material,
   wherein a hydrogen leak path is defined within the volume of the housing, a hydrogen accumulation region is defined within the volume of the housing, or both the hydrogen leak path and the hydrogen accumulation region is defined within the volume of the housing, the hydrogen storage structure is located within the volume of the housing in at least one of the hydrogen leak path or in the hydrogen accumulation region, and wherein the hydrogen storage material removes hydrogen from the volume of the housing by chemisorption, physisorption, or a combination thereof.

2. The hydrogen fuel system of claim 1, wherein the hydrogen storage structure is a removable cartridge.

3. The hydrogen fuel system of claim 1, wherein the hydrogen storage material is an irreversible hydrogen storage material.

4. The hydrogen fuel system of claim 1, wherein the hydrogen storage material is a reversable hydrogen storage material that stores hydrogen and releases hydrogen, the reversable hydrogen storage material having a desorption temperature, and
   wherein the reversable hydrogen storage material adsorbs hydrogen at temperatures from three hundred degrees Fahrenheit to eight hundred fifty degrees Fahrenheit and that has a desorption temperature from three hundred fifty degrees Fahrenheit to one thousand seven hundred degrees Fahrenheit.

5. The hydrogen fuel system of claim 1, wherein the housing is a shell arranged at least partially around the hydrogen fuel component, the shell including a wall having an inner surface facing the volume, the hydrogen storage structure being attached to the inner surface of the wall.

6. The hydrogen fuel system of claim 5, wherein the inner surface of the wall is an arcuate surface around a shell centerline axis, the hydrogen storage material being located over a range from ninety degrees to two hundred seventy degrees around the shell centerline axis.

7. The hydrogen fuel system of claim 5, wherein the hydrogen storage structure is a physical deposit of the hydrogen storage material formed on the inner surface of the wall.

8. The hydrogen fuel system of claim 5, wherein the hydrogen storage structure is a removable structure.

9. The hydrogen fuel system of claim 1, wherein the volume is at least a portion of a compartment, and the housing defines at least a portion of the compartment.

10. The hydrogen fuel system of claim 9, wherein the hydrogen storage material is located in the compartment and spaced apart from the housing.

11. The hydrogen fuel system of claim 9, wherein the hydrogen storage structure is one hydrogen storage structure of a plurality of hydrogen storage structures, and
   wherein the hydrogen accumulation region is one of a plurality of hydrogen accumulation regions located in the compartment, each hydrogen accumulation region of the plurality of hydrogen accumulation regions being discrete from each other and including one of the plurality of hydrogen storage structures.

12. The hydrogen fuel system of claim 9, further comprising a hydrogen-sensitive component located within the compartment and spaced apart from the hydrogen fuel component, the hydrogen storage structure being located between the hydrogen-sensitive component and the hydrogen fuel component.

13. The hydrogen fuel system of claim 9, wherein the compartment includes an upper wall, the hydrogen storage material being located over a majority of the upper wall.

14. The hydrogen fuel system of claim 9, wherein the compartment is a vented compartment.

15. The hydrogen fuel system of claim 14, wherein the compartment is vented to atmosphere.

16. The hydrogen fuel system of claim 14, wherein the compartment includes a downstream wall relative to the flow of a vent fluid through the compartment, the hydrogen storage material being located over a majority of the downstream wall.

17. A gas turbine engine for an aircraft, the gas turbine engine comprising:
   the hydrogen fuel system of claim 1;
   a fan; and
   a nacelle circumscribing the fan and having a nacelle compartment formed therein, the volume being at least a portion of the nacelle compartment, and the housing being a nacelle housing defining at least a portion of the nacelle compartment.

18. A hydrogen fuel system for an aircraft, the hydrogen fuel system comprising:
   a housing defining a volume that is at least partially enclosed;
   a hydrogen fuel component having a hydrogen fuel passage for hydrogen fuel to flow therethrough, the hydrogen fuel component being located within the volume of the housing; and
   a hydrogen storage structure including a hydrogen storage material having a morphology for retaining hydrogen within the hydrogen storage material,
   wherein a hydrogen leak path is defined within the volume of the housing, a hydrogen accumulation region is defined within the volume of the housing, or both the hydrogen leak path and the hydrogen accumulation region is defined within the volume of the housing, the hydrogen storage structure is located within the volume of the housing in at least one of the hydrogen leak path or in the hydrogen accumulation region,
   wherein the hydrogen storage material is a reversable hydrogen storage material that stores hydrogen and releases hydrogen, the reversable hydrogen storage material having a desorption temperature, and
   wherein the reversable hydrogen storage material is a cryogenic hydrogen storage material that adsorbs hydrogen at temperatures at or below negative three hundred degrees Fahrenheit and that has a desorption temperature from negative two hundred degrees Fahrenheit to zero degrees Fahrenheit.

19. A gas turbine engine for an aircraft, the gas turbine engine comprising:

a hydrogen fuel system comprising:

a housing defining a volume that is at least partially enclosed;

a hydrogen fuel component having a hydrogen fuel passage for hydrogen fuel to flow therethrough, the hydrogen fuel component being located within the volume of the housing; and a hydrogen storage structure including a hydrogen storage material having a morphology for retaining hydrogen within the hydrogen storage material, wherein a hydrogen leak path is defined within the volume of the housing, a hydrogen accumulation region is defined within the volume of the housing, or both the hydrogen leak path and the hydrogen accumulation region is defined within the volume of the housing, the hydrogen storage structure is located within the volume of the housing in at least one of the hydrogen leak path or in the hydrogen accumulation region;

a turbo-engine comprising:

a compressor section including one or more compressors to generate compressed air;

a combustor located downstream of the compressor section to receive the compressed air, the combustor including a combustion chamber and a fuel nozzle fluidly coupled to the hydrogen fuel system to receive the hydrogen fuel from the hydrogen fuel system and to inject the hydrogen fuel into the combustion chamber, generating a fuel and air mixture, the fuel and air mixture being combusted in the combustion chamber to generate combustion products; and a turbine section located downstream of the combustor to receive the combustion products, the turbine section including one or more turbines to be rotated by the combustion products;

and an outer casing enclosing the turbo-engine and having a turbo-engine compartment, the volume being at least a portion of the turbo-engine compartment, and the housing being at least a portion of the outer casing.

* * * * *